US008379950B2

(12) United States Patent
Ye et al.

(10) Patent No.: US 8,379,950 B2
(45) Date of Patent: Feb. 19, 2013

(54) MEDICAL IMAGE PROCESSING

(75) Inventors: Xujiong Ye, Middlesex (GB); Gregory Gibran Slabaugh, London (GB)

(73) Assignee: Medicsight PLC, London (GB)

( * ) Notice: Subject to any disclaimer, the term of this patent is extended or adjusted under 35 U.S.C. 154(b) by 162 days.

(21) Appl. No.: 13/039,172

(22) Filed: Mar. 2, 2011

(65) Prior Publication Data

US 2011/0216951 A1 Sep. 8, 2011

(30) Foreign Application Priority Data

Mar. 3, 2010 (GB) .................................. 1003564.0

(51) Int. Cl.
G06K 9/00 (2006.01)
A61B 6/00 (2006.01)
(52) U.S. Cl. .......................................... 382/128; 378/4
(58) Field of Classification Search .................. 382/103, 382/128, 129, 130, 131, 132, 236; 378/4, 378/21–27, 901; 600/407, 410, 411, 425, 600/427; 348/169, 170; 128/920, 922
See application file for complete search history.

(56) References Cited

U.S. PATENT DOCUMENTS

| 6,574,357 | B2 * | 6/2003 | Wang ............................. 382/132 |
| 7,620,227 | B2 * | 11/2009 | Gering et al. ................. 382/128 |
| 2006/0050960 | A1 | 3/2006 | Tu et al. |
| 2009/0092300 | A1 | 4/2009 | Jerebko et al. |
| 2010/0021026 | A1 | 1/2010 | Collins et al. |

FOREIGN PATENT DOCUMENTS

WO WO 2009/045460 A1 4/2009

OTHER PUBLICATIONS

G. Slabaugh, Xiaoyun Yang, Xujiong Ye, Richard Boyes and Gareth Beddoe, "A Robust and Fast System for CTC Computer-Aided Detection of Colorectal Lesions," Algorithms, 2010, 3, pp. 21-43.
P. Viola, Michael J. Jones, "Robust Real-Time Face Detection," International Journal of Computer Vision 57(2), 137-154, 2004.
Robert M. Haralick, K. Shanmugam, I. Dinstein, "Textural Features for Image Classification," IEEE Trans on Systems, Man, and Cybernetics, 3(6), 1973.
David S. Paik, Christopher F. Beaulieu, Geoffrey D. Rubin, Burak Acar, R. Brooke Jeffrey, Jr., Judy Yee, Joyoni Dey, Sandy Napel, "Surface Normal Overlap: A Computer-Aided Detection Algorithm With Application to Colonic Polyps and Lung Nodules in Helical CT," IEEE Trnas. On Medical Imaging, 23(6), 2004.
Hidefumi Kobatake, Masayuki Murakami, "Adaptive Filter to Detect Rounded Convex Regions : Iris Filter," International Conference on Pattern Recognition, 1996.
H. Yoshida, J. Nappi, "Three-Dimensional Computer-Aided Diagnosis Scheme for Detection of Colonic Polyps," IEEE Trnas. on Medical Imaging, 20(12), 2001.

(Continued)

Primary Examiner — Abolfazl Tabatabai
(74) Attorney, Agent, or Firm — Sterne, Kessler, Goldstein & Fox P.L.L.C.

(57) ABSTRACT

A computer-implemented method of detecting an object in a three-dimensional medical image comprises determining the values of a plurality of features at each voxel in at least a portion of the medical image. Each feature characterises a respective property of the medical image at a particular voxel. The likelihood probability distribution of each feature is calculated based on the values of the features and prior medical knowledge. A probability map is generated by using Bayes' law to combine the likelihood probability distributions, and the probability map is analysed to detect an object.

32 Claims, 7 Drawing Sheets

OTHER PUBLICATIONS

Yong Zhou, Arthur W. Toga, "Efficient Skeletonization of Volumetric Objects," IEEE Transactions of Visualization and Computer Graphics, vol. 5, No. 3, pp. 197-209, 1999.

Paulo R. S. Mendonca et al., "Detection of Polyps via Shape and Appearance Modeling," (Proc. MICCAI 2008 Workshop: Computational and Visualization Challenges in the New Era of Virtual Colonoscopy, pp. 33-39).

UKIPO Search Report dated Jul. 1, 2010.

European Search Report issued Sep. 13, 2011 for European Patent Application No. EP 11 15 4237.

Ye et al., "Shape-Based CT Lung Nodule Segmentation Using Five-Dimensional Mean Shift Clustering and MEM with Shape Information,"Biomedical Imaging: From Nano to Macro, 2009, IEEE International Symposium on IEEE, Piscataway, NJ, Jun. 28, 2009, pp. 482-485.

Ye et al., Shape-Based Computer-Aided Detection of Lung Nodules in Thoracic CT Images, IEEE Transactions on Biomedical Engineering, IEEE Service Center, Piscataway, NJ, vol. 56, No. 7, Jul. 1, 2009, pp. 1810-1820.

Ye et al., "A Bayesian Approach for False Positive Reduction in CTC CAD," Proceedings of MICCAI 2010 Workshop: Virtual Colonoscopy & Abdominal Imaging, Sep. 20, 2010, pp. 49-54.

* cited by examiner

FIG. 5
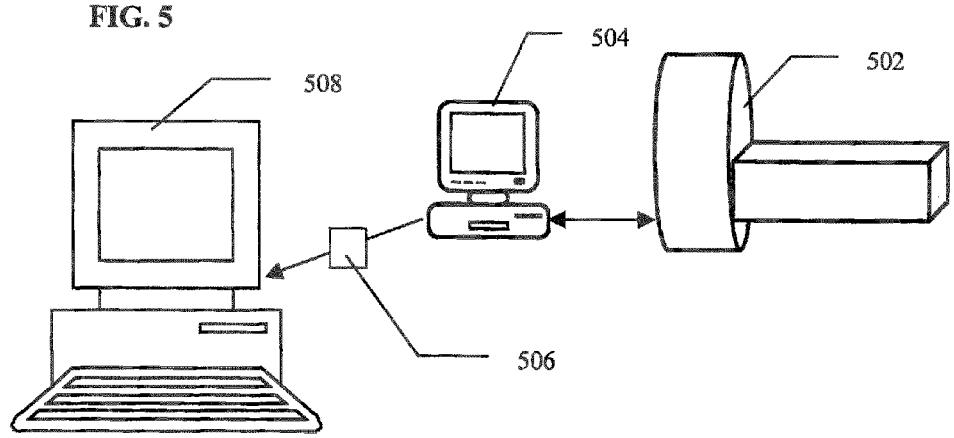
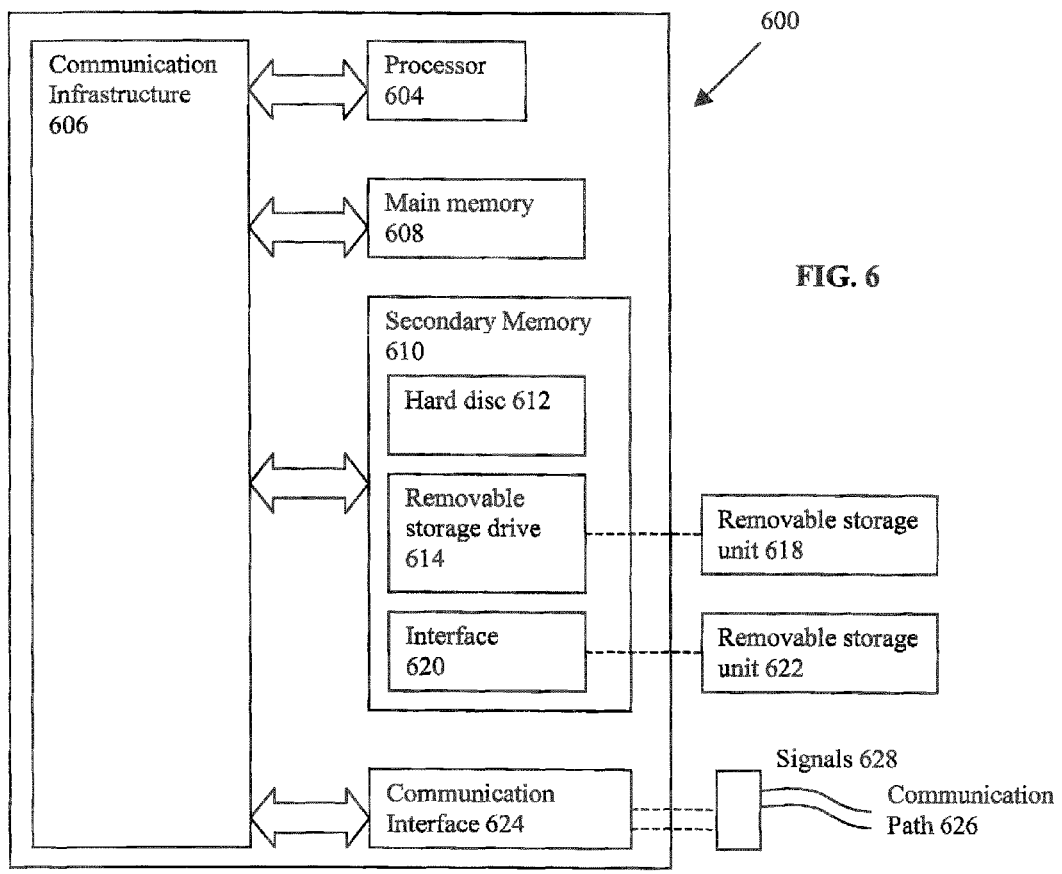
FIG. 6

MEDICAL IMAGE PROCESSING

FIELD OF THE INVENTION

The present invention relates to medical imaging and analysis. More particularly, the present invention relates to a method and apparatus for detecting abnormalities (lesions) in medical images. The present invention can be used to process medical images in order to detect potential lesions and/or to reject false positives when potential lesions have already been detected.

BACKGROUND TO THE INVENTION

Medical imaging is generally recognised as key to better diagnosis and patient care. It has experienced explosive growth over the last few years due to imaging modalities such as x-ray, Computed Tomography (CT), ultrasound, Magnetic Resonance Imaging (MRI) and Positron Emission Tomography (PET). Conventionally, medical images have been inspected visually by highly-trained medical practitioners in order to identify anatomic structures of interest, such as lesions. However, the process can be tedious, time consuming and must be performed with great care.

Computed Tomography Colonography (CTC) is a form of medical imaging that has been used for the detection and screening of colonic cancers. The purpose of CTC is to locate and identify polyps on the colon wall by computationally processing CT scans. A polyp is an abnormal growth on a mucous membrane, and may be benign or malignant (cancerous). The effectiveness of CTC is hindered by the time taken to interpret the large amount of data that is generated by a CTC scan, variability among human experts and the complexity of the classification. A typical modern CTC scan produces around one thousand axial CT images (slices) for the supine and prone data sets. To address these problems, a number of Computer Aided Detection (CAD) schemes for detecting polyps with CTC have been proposed.

A conventional CAD system for polyp detection comprises two steps. In the first step, which is known as "candidate generation", image processing techniques are used in order to identify initial polyp candidates (where a "polyp candidate" is the term used to describe an anatomical structure that might be a polyp, but which has not yet been confirmed to be a polyp). Generally, a large number of false positives are produced by the first step and significantly outweigh the number of true positives. The term "false positive" (FP) refers to a polyp candidate that is not actually a polyp, whereas the term "true positive" (TP) refers to a polyp candidate that can be confirmed to be a polyp. Hence, the second step of a CAD system involves the use of image processing techniques to reduce the number of FPs, preferably without also reducing the number of TPs. This second step is known as "false positive reduction".

Typical approaches to CTC CAD can be classified as "shape-based" or "appearance-based".

Shape-based methods calculate certain characteristics of the geometry of structures in the medical image, so as to detect structures having shapes that are commonly associated with lesions. Known shape-based methods typically rely on various "shape features" derived from first order differential geometric quantities (such as surface normal or gradient) or second order Hessian matrices (such as principal curvature, mean curvature, Gaussian curvature, or shape index). Such shape-based methods are useful in detecting spherical objects or objects with local spherical elements. However, in practice, lesions (such as polyps) are often abnormal growths that exhibit varying morphology, and many polyps can not be adequately characterised using local differential geometric measures. Hence, shape-based methods may fail to detect lesions with sufficient reliability.

Appearance-based methods typically rely on non-geometric features derived from the image intensity, such as wavelet features. While potentially useful in detecting polyps of wider shape morphologies, appearance-based methods originate from research into face detection and so are not optimal for detecting lesions. Appearance-based methods may fail to detect lesions with sufficient reliability.

Thus, there is a need for improved methods for computer aided detection of lesions, abnormalities or other anatomical structures in medical images, particularly for use in CTC.

P. R. S. Mendonça et al., "Detection of Polyps via Shape and Appearance Modeling" (Proc. MICCAI 2008 Workshop: Computational and Visualization Challenges in the New Era of Virtual Colonoscopy, pp. 33-39) relates to a CAD system for the detection of colorectal polyps in CT. The CAD system is based on shape and appearance modelling of structures of the colon and rectum.

SUMMARY OF THE INVENTION

A first aspect of the invention provides a computer-implemented method of detecting an object in a three-dimensional medical image, comprising: determining the values of a plurality of features at each voxel in at least a portion of the medical image, wherein each feature characterises a respective property of the medical image at a particular voxel; calculating the likelihood probability distribution of each feature based on the values of the features and prior medical knowledge, wherein the prior medical knowledge comprises one or more parameter values derived from training data; generating a probability map by using Bayes' law to combine the likelihood probability distributions, wherein the probability map indicates the probability of each voxel in said at least a portion of the medical image containing an object to be detected; and analysing the probability map to detect an object.

The method allows different types of features, particularly appearance features and shape features, to be combined in order to detect objects in a medical image. The advantages of the Bayesian technique disclosed herein are as follows. Firstly, there is a large amount of the uncertainty inherent to the detection problems in medical imaging which can be best accounted for through statistical techniques. Secondly, there often is useful medical knowledge (such as lesion density, size, shape, location, etc.) that can be utilised to constrain the solution of detection problems. This prior medical knowledge can be easily encoded into a Bayesian model. Finally, a Bayesian technique provides a unified framework to incorporate various—often disparate—features into a single statistical model. The probability distribution for each feature tenor is preferably modelled using a parameterised functional form which is based on prior medical knowledge and a training step for the learning of function parameters.

To the inventors' knowledge, this is the first time that a learning-based Bayesian approach has been used in a CTC CAD system. By deriving the values of the parameters that are used model the various features (such as the shape, appearance and/or anatomical features described below) from training data, the Bayesian framework disclosed herein provides robust and consistent performance. In particular, the Bayesian framework can have a high sensitivity for detecting objects, whilst generating relatively few false positives.

In contrast, the method disclosed by Mendonça et al. (ibid.) is not based upon training data. Instead, Mendonça et al. model polyps as simplistic geometric shapes. For example, polyps are modelled as ellipsoids. Such models have limited capability to model the complexity of actual polyps found in human anatomy, but do not require any training from example data. The method disclosed herein, however, can make use of more expressive shape models (such as a model based upon a second principal curvature flow, as described below) that are capable of modelling the variation in polyp shapes seen in practice. Also, in Mendonça et al.'s method, only medical knowledge is used in modelling the prior probability. In preferred examples of the method disclosed herein, however, the prior probability is constrained by spatial information. The method disclosed herein calculates the probability that each voxel contains an object to be detected and, therefore, an accurate probability map can be obtained by considering spatial information.

In addition, the flexibility of the Bayesian framework disclosed herein allows the inclusion of "anatomical features" that characterise a particular point in the three-dimensional medical image with respect to prior medical knowledge of the characteristics of the type of lesion that is to be detected. For example, the Bayesian framework can incorporate a model that takes advantage of the fact that colonic polyps appear more frequently in the lower extremities of the colon (i.e., rectum and sigmoid).

The values of the features may be determined at every voxel in the medical image or, more preferably, may be determined at just a portion of the image. The steps involved in determining the value of a feature will be dependent on the nature of the feature. For example, determining the value of an appearance feature may simply require an intensity value of a particular voxel to be read from the medical image data, whereas the values of shape features and anatomical features are typically determined by performing one or more calculations based upon the intensity value of the voxel (and, possibly, its neighbouring voxels).

The object to be detected is preferably an abnormal anatomical structure, such as a lesion. For example, the lesion may be a colonic polyp, lung module, mammographic mass, liver lesion or brain lesion.

Preferably, the training data comprises a plurality of three-dimensional medical images. Preferably, each three-dimensional medical image in the training data comprises a label indicating one or more voxels that contain the type of object (such as a lesion) that is to be detected. Preferably, the labels in the training data have been assigned by a clinician.

Preferably the parameter values are optimised to generate a predetermined number of false positives when the method is performed upon the training data. Thus, the sensitivity of a method can be increased without causing an unacceptably high number of false positives to be generated.

Preferably the features include one or more appearance features. Preferably the appearance features comprise image intensity information derived from the medical image. Preferably the appearance features comprise a wavelet feature derived from the medical image. Preferably the appearance features comprise a texture feature derived from the medical image.

Preferably the features include one or more shape features. Preferably the shape features include a first-order shape feature derived from the medical image. Preferably the first order shape feature is a first order differential geometric quantity. More preferably, the first order shape feature is based on surface normal overlap and/or gradient concentration. Preferably the shape features include one or more second-order shape features. Preferably at least one of the second-order shape features is determined from a Hessian matrix. Preferably said at least one of the second order shape features is calculated from the eigenvalues of the Hessian matrix. Preferably at least one of the second order shape features represents a volumetric shape index of the image at a particular voxel. Preferably at least one of the second order shape features represents a second principal curvature flow of the image at a particular voxel.

Preferably the method further comprises calculating a spatial prior probability. Preferably the step of generating a probability map further comprises using Bayes' law to combine the likelihood probability distributions and the spatial prior probability. Preferably the spatial prior probability comprises a spatial constraint. Preferably the spatial constraint is imposed by a Markov Random Field and a Gibbs Random Field.

Preferably calculating the likelihood probability distribution of a feature comprises calculating the value of a Gaussian function at a particular voxel, wherein the Gaussian function models the probability distribution of that feature. Preferably the Gaussian function models the probability distribution of a feature that characterises the intensity of the medical image, and wherein calculating the value of the Gaussian function includes: (i) treating a mean intensity in the Gaussian function as a fixed value; or (ii) calculating a mean intensity in the Gaussian function as a function of the size of a previously-detected object. Preferably calculating the mean intensity as a function of the size of a previously-detected object includes calculating an expression that is based upon the presence of the partial volume effect in the medical image.

Preferably the features include one or more anatomical features. Preferably determining the value of an anatomical feature involves calculating a colon centreline. Preferably determining the value of an anatomical feature involves calculating a colon boundary distance transform.

Preferably the step of analysing the probability map comprises thresholding on the probability map and labelling regions in the thresholded probability map.

Preferably the portion of the image is defined by a mask. The use of a mask can reduce the computational requirements of the method, by avoiding the need to perform the method upon all voxels in the image.

Preferably the detected object comprises a region within the image having an intensity and a size that are within an intensity range and a size range of a type of object being sought.

The method can be used in either or both two main steps of a computer aided detection algorithm, i.e. in the candidate generation step and/or in the false positive reduction step. When used in the false positive reduction step, preferably the step of analysing the probability map includes determining whether a previously-detected object is a false positive. The previously-detected object may have been detected using a candidate generation algorithm that is different from that disclosed herein. The experimental results demonstrate the method's high detection performance, which has a high sensitivity and generates few FP regions. In particular, the method disclosed herein is capable of detecting polyps of varying morphologies.

Preferably the method further comprises segmenting an image based upon the result of the step of analysing the image. Preferably the image is segmented to identify a region of the image that comprises a lesion.

A further aspect of the invention provides an apparatus operable to perform the method described herein. Preferably the apparatus comprises: means for determining the values of a plurality of features at each voxel in at least a portion of the medical image, wherein each feature characterises a respective property of the medical image at a particular voxel; means for calculating the likelihood probability distribution of each feature based on the values of the features and prior medical knowledge, wherein the prior medical knowledge comprises one or more parameter values derived from training data; means for generating a probability map by using Bayes' law to combine the likelihood probability distributions, wherein the probability map indicates the probability of each voxel in said at least a portion of the medical image containing an object to be detected; and means for analysing the probability map to detect an object.

A further aspect of the invention provides a computer-readable medium comprising instructions which, when executed by a suitable computer, cause the computer to perform the method described herein.

Further aspects of the invention provide a method or apparatus substantially as herein described with reference to and/or as illustrated in the accompanying drawings.

BRIEF DESCRIPTION OF THE DRAWINGS

Preferred features of the invention will now be described, purely by way of example, with reference to the accompanying drawings in which:

FIG. 5 is a schematic diagram showing a medical imaging device and a remote computer for processing image data from the medical imaging device;

FIG. 6 is a more detailed diagram of the remote computer shown in FIG. 5;

DETAILED DESCRIPTION

Figure 1:
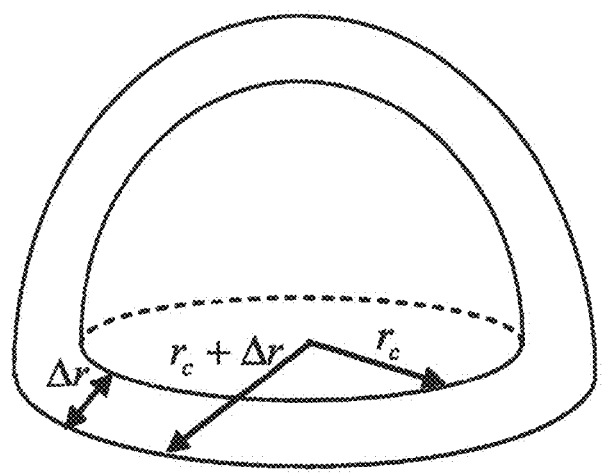
FIG. 1 is a schematic diagram of a colonic polyp.

The invention will now be described, purely by way of example, in the context of a method of identifying polyps in the colon. However, it is to be understood that the invention is not limited solely to the identification of colonic polyps. The invention can also be used to identify other anatomical features such as lung nodules, liver lesions, mammographic masses, brain lesions, any other suitable type of abnormal tissue or suitable types of healthy tissue.

The invention is directed to processing three-dimensional medical image data using a Bayesian framework. The term "Bayesian framework" as used herein refers to the use of Bayes' law to combine statistical information relating to a plurality of features that characterise properties of a medical image, in order to determine the probability that a particular voxel in the medical image represents a particular object. The three-dimensional medical image data can be generated by a computed tomography (CT) scan, or from a magnetic resonance imaging (MRI) scan, a positron emission tomography (PET) scan, an ultrasound scan or from an x-ray image. It will be appreciated that other suitable medical imaging methods can also be used.

For example, when the medical image data is generated by a CT scan, the three-dimensional (3D) medical image data comprises a series of CT image slices obtained from a CT scan of an area of a human or animal patient. Each slice is a two-dimensional digital greyscale image of the x-ray absorption of the scanned area. The properties of the slice depend on the CT scanner used. For example, a high-resolution multi-slice CT scanner may produce images with a resolution of 0.5-1.0 mm/pixel in the x and y directions (i.e. in the plane of the slice). Each pixel may have a 16-bit greyscale representation. The intensity value of each pixel may be expressed in Hounsfield units (HU). Sequential slices may be separated by a constant distance along the z direction (i.e. the scan separation axis); for example, by a distance of between 0.5-2.5 mm. Hence, the scan image formed by a plurality of slices may be a three-dimensional (3D) greyscale image, with an overall size depending on the area and number of slices scanned. Each pixel may then be considered to be a voxel (or volumetric pixel) in three-dimensional space.

Overview of the Bayesian Framework

The 3D image data is considered to be a set of voxels, X, where $X=\{x_i, i=1, \ldots, n\}$. X is a random variable that represents the spatial position of each voxel $x_i$ in the image data. Each voxel $x_i$ can be associated with a set of features, F, where $F=\{F_j, j=1, \ldots, m\}$. Each feature $F_j$ characterises a particular property of the image data at a particular voxel, and each voxel is associated with one or more features $F_j$. For example, one feature might characterise the shape (i.e. the three-dimensional geometry) of the image at a particular voxel, whilst another feature might characterise the intensity of the image at that voxel. The aim of the arrangement disclosed herein is to assign a label to each individual voxel in the image, wherein the label identifies the particular type of tissue that is imaged in the voxel in question. Thus, it is assumed that there is a set of labels, $\Lambda$, where $\Lambda=\{l_0, \ldots l_{K-1}\}$. For example, label $l_0$ could denote that the voxel represents normal mucosal tissue (such as a colonic fold), whilst label $l_1$ could denote that the voxel represents abnormal tissue (such as a polyp). As will be discussed below, one of the labels in the set of labels $\Lambda$ is assigned to each voxel based on a probability calculation using a Bayesian framework.

The features $F_j$ can be any 2D or 3D feature calculated for each 3D voxel. In general, features that are used for lesion detection can be categorised into the following three sets:

1. Appearance features. The term "appearance feature" is used to describe a feature that characterises the image intensity at a particular point in a three-dimensional medical image. The example of an appearance feature that is described in detail below under the heading "Intensity model" is based directly on the image intensity at a particular voxel. Other examples of appearance features are indirectly based on image intensity. Examples of appearance features that are indirectly based on image intensity include wavelet features and texture features. An example of a wavelet feature is a Haar-like feature, which is described in reference [2]. An example of a texture feature is a grey level co-occurrence matrix feature, which is described in reference [3]. The invention also encompasses other suitable appearance features. It is noted that, unlike the shape features described below, appearance features do not characterise the geometry of the tissue that was scanned to generate the medical image.

Lesions exhibit different intensities and/or textures with respect to the surrounding healthy tissue. Appearance features aim to detect lesions by identifying differences in intensity and/or texture that distinguish lesions from surrounding healthy tissue. In the context of CTC CAD, appearance features take advantage of the fact that polyps typically exhibit a slightly elevated intensity and homogeneous textures relative to surrounding mucosal tissue.

2. Shape features. The term "shape feature" is used to describe a feature that characterises the geometry of an iso-intensity surface at a particular point in a three-dimensional medical image. An iso-intensity surface is a locus of points in the three-dimensional medical image that have the same intensity values. For example, where the medical image is generated by x-ray imaging, the iso-intensity surface is a locus of voxels having the same level of x-ray absorption. The shape of the iso-intensity surface reflects the shape of the tissue that was scanned to generate the medical image and, therefore, the shape of the tissue can be characterised by characterising the geometry of the iso-intensity surface. Shape features can be calculated by first calculating an analytic expression for the iso-intensity surface (which is known as explicitly extracting the iso-intensity surface), and then calculating the shape features using the analytic expression. Methods for explicitly extracting an iso-intensity surface are known to those skilled in the art. Alternatively, shape features can be calculated directly from the medical image data without explicitly extracting the iso-surface, and so it can be said that such shape features are based upon an implicit representation of the iso-surface. By avoiding the need to explicitly extract the iso-intensity surface, the computational effort required to calculate the shape features can be reduced. The examples of shape features described in detail herein are calculated based upon an implicit representation of the iso-intensity surface, but it will be understood that the invention also encompasses shape features that are calculated from an explicitly extracted iso-intensity surface.

Examples of shape features include first order differential geometric quantities (such as surface normal overlap [4] or gradient concentration [5, 6]) and second order features (such as principal curvature [7], mean curvature [7], Gaussian curvature [7] or shape index [6, 8]). Methods for calculating these particular examples of shape features are described in the references cited in the preceding sentence. It is noted that these are merely examples of shape features, and that the invention encompasses any other suitable shape feature.

In the context of CTC CAD, shape features take advantage of the fact that polyps tend to have rounded shapes or partially spherical portions, whereas colonic folds tend to have elongated shapes. Colonic folds are benign, but irregularly-shaped, regions in the colon wall. Care must be taken to avoid generating false positives by mistaking colonic folds for polyps.

For example, the first and second principal curvatures (i.e. $k_1(x_i)$ and $k_2(x_i)$ as defined in Equations 11 and 12 below) both have a positive value for a polyp. In contrast, the first principal curvature for a colonic fold has a positive value, whilst the second principal curvature is close to zero for a colonic fold. Thus, the value of the second principal curvature can be used to detect polyps, whereas the first principal curvature cannot discriminate between polyps and folds. The mean curvature is the average of the first and second principal curvatures and so cannot discriminate between polyps and folds (although the first principal curvature and the mean curvature may be useful for detecting other types of anatomical structure). The Gaussian curvature is the product of the first and second principal curvatures, and so has a positive value for a polyp and a value close to zero for a fold. Thus, the value of the Gaussian curvature can be used to detect polyps.

3. Anatomical features. The term "anatomical feature" is used to describe a feature that characterises a particular point in a three-dimensional medical image with respect to prior medical knowledge of the characteristics of the type of lesion that is to be detected.

For example, clinical observations may indicate that a particular type of lesion is more prevalent at a particular location in the anatomy. The probability that a particular voxel contains a particular type of lesion can, therefore, be characterised in terms of the distance of the voxel from the location in the anatomy at which that type of lesion is prevalent.

Examples of anatomical features that can be used in CTC CAD include:
(i) Distance to rectum: this feature is based on prior medical knowledge that polyps are typically more prevalent in the lower extremities of the colon (i.e. in the rectum and sigmoid) rather than further up the colon anatomy (towards the caecum).
(ii) Distance from mucosal surface: this feature is based on prior medical knowledge that polyps are typically located on the mucosal surface (i.e. the surface of the colon). Hence, a voxel that is located relatively close to the mucosal surface has a higher probability of being labelled as a polyp than a voxel that is located further away from the colonic surface.

The particular features $F_j$ that are to be used is chosen in accordance with the properties of the particular type of anatomical structure that is to be detected. Thus, whilst the particular shape, appearance and anatomical features that are described in detail herein are particularly suitable for detecting colonic polyps, different features may be used to detect other types of lesion.

A Bayesian technique provides a generic framework to combine all of the features $F_j$ into one statistical model. In a preferred example of a method of detecting colonic polyps, an intensity feature, I, a second-order shape feature, S, and an anatomical feature, L, are used. Hence, $F_1=I$, $F_2=S$ and $F_3=L$. In this example, the second-order shape feature $F_2$ comprises a shape index feature and a second principal curvature flow feature (described in detail below).

Two labels are used in the preferred example of a method of detecting colonic polyps. Thus, the set of labels is $\Lambda=\{l_0 \ldots l_{K-1}\}$, where k=2 and where $l_0$ is a non-polyp label (i.e. $l_0$ denotes that the voxel does not represent a polyp) and $l_1$ is a polyp label (i.e. $l_1$ denotes that the voxel does represent a polyp).

A family of random variables, R, is defined, where R=$\{R_1 \ldots R_n\}$. $R_i$ takes a value $r_i \in \Lambda$, where $r_i$ is the label for voxel $x_i$. Thus, in the above-mentioned example, $r_i$ is a member of the set of labels $\Lambda$ such that $r_i$ is equal to either $l_0$ or $l_1$, thereby labelling each voxel as either a polyp or a non-polyp. The symbol P(X|F) denotes the conditional probability of the random variable $R_i$ taking value of $r_i=l_1$ at $x_i$ in probability space, namely, P(X|F)=P($r_i=l_1$|F). Bayes' law can be used to calculate P(X|F) as:

$$P(X \mid F) = \frac{P(F \mid X) \cdot P(X)}{P(F)} \qquad (1)$$

The terms P(X|F) and P(F|X) are respectively called the posterior probability and likelihood. The term P(X) is called the prior probability of X, whilst P(F) is called the prior probability of F. The aim of the invention is to detect lesions by calculating the value of the posterior probability P(X|F) at each voxel in the three-dimensional medical image data, using values of the likelihood P(F|X) and prior probabilities P(X) and P(F) that are calculated based upon the medical image data and prior medical knowledge.

In the preferred example of a method for detecting colonic polyps, it is assumed that each feature $F_1$, $F_2$, $F_3$ is conditionally independent, thereby allowing Equation 1 to be written as:

$$P(X|F) = P(X|F_1, F_2, F_3) = \frac{P(F_1|X) \cdot P(F_2|X) \cdot P(F_3|X) \cdot P(X)}{P(F_1) \cdot P(F_2) \cdot P(F_3)} \quad (2)$$

Given $F_1$=I, $F_2$=S, $F_3$=L, therefore, $$P(X|I,S,L) \propto P(I|X) \cdot P(S|X) \cdot P(L|X) \cdot P(X)$$

Equation 1 is used to model the probability of a polyp labelling existing at each voxel in the CT colonic volume. To put this another way, for each voxel, Equation 1 is used to calculate a value indicating the probably that that voxel represents a polyp.

The probability distribution of each feature in Equation 1 (i.e. $P(F_1|X)$, $P(F_2|X)$ and $P(F_3|X)$) is modelled using a parameterised functional form based on prior medical knowledge and a training step. The way in which each term in Equation 1 is modelled will now be described.

Modelling the likelihood term, P(F|X)

In the Bayesian framework, based on Equation 2, the likelihood term P(F|X) indicates the joint density distributions of all features for class $l_1$. The way in which each feature $F_1$, $F_2$, $F_3$ is modelled is described in detail below under the subheadings "Intensity model", "Shape model" and "Anatomical model" respectively.

(i) Intensity Model

The intensity model is based on a prior medical knowledge guided learning method. The parametric form of the intensity model is given by a Gaussian function as:

$$P(F_1|X) = \exp\left(-\frac{(F_1 - \mu_I)^2}{\delta_I^2}\right) = \exp\left(-\frac{(I - \mu_I)^2}{\delta_I^2}\right) \quad (3)$$

where $\mu_I$ and $\delta_I$ are the mean and standard deviation of the intensity of a lesion, respectively.

Equation 3 calculates the probability that a voxel $x_i$ represents a lesion based upon the intensity value I in the image data at voxel $x_i$ and predetermined values of $\mu_I$ and $\delta_I$.

When the intensity model of Equation 3 is to be used for candidate generation, $\mu_I$ and $\delta_I$ have fixed values that are determined through a training step. The way in which these values are determined is discussed below, under the heading "Training". Thus, the values of $\mu_I$ and $\delta_I$ are based upon prior medical knowledge of the intensity of lesions that have previously been detected.

When the intensity model of Equation 3 is to be used for false positive reduction, $\mu_I$ can be defined as a function of polyp size. More particularly, $\mu_I$ can be defined as a function of the radius r of the polyp, as described below.

It is well known that CT images exhibit the partial volume effect (PVE) due to limitations in scanning resolution. PVE occurs when a voxel contains a mixture of different materials (for example, when a voxel contains both tissue and air), such that the intensity value at that voxel is a function of the intensity value of each of the individual materials contained in that voxel. For tissues like polyps near air, the boundary of the polyp may appear darker than that of its central region as a result of the PVE. Since the PVE only affects the polyp's boundary, as a proportion of the total size of the polyp, a larger polyp has relatively less PVE than a smaller polyp. Conversely, a small polyp exhibits more PVE than a larger polyp. This information can be included in the intensity model by adjusting the mean $\mu_I$ to be a function of polyp size.

It is assumed that a polyp has a hemispherical shape and contains two parts: a core part ($r_c$) and a PVE part ($\Delta r$), as illustrated in the schematic diagram of a polyp of FIG. 1. The whole polyp radius is $r=r_c+\Delta r$. Let the core part have mean intensity $m_C$, and the PVE part have mean intensity $m_P$. The mean intensity ($\mu_I$) of a polyp is adaptively determined as:

$$\mu_I = f \cdot m_c + (1-f) \cdot m_p \quad (4)$$

where f is the fraction of the core part's volume compared with the whole polyp's volume, namely, $$f = \frac{r_c^3}{r^3} = \frac{(r - \Delta r)^3}{r^3} \quad (5)$$

Combining Equations 4 and 5 gives:

$$\mu_I = \frac{(r - \Delta r)^3}{r^3} \cdot m_c + \left(1 - \frac{(r - \Delta r)^3}{r^3}\right) \cdot m_p \quad (6)$$

It is noted that when a polyp is very small there might be no core part, i.e. $r_c$=0 and f=0, therefore, r=$\Delta r$. That is, a very small polyp only contains a PVE part, so the mean intensity $\mu_I$ is dominated by the mean intensity of the PVE part $m_P$. This occurs because the size of a small polyp's interface with the surrounding air is comparable to (or even greater than) the size of the polyp itself, such that the PVE part $m_P$ is comparable to the core part $m_C$. In contrast, when a polyp is very large (i.e. as $r \to \infty$) then f=1, so the mean intensity $\mu_I$ is dominated by the mean intensity of the core part $m_C$.

When the intensity model of Equation 3 is to be used for false positive detection, the radius r of the polyp can be determined by measuring the radius of the candidate region that was detected during the preceding step of candidate generation. The mean intensities of the core part $m_C$ and PVE part $m_P$, and the thickness of the PVE part $\Delta r$, are determined from training data, as discussed below under the heading "Training". Thus, the values of $m_C$, $m_P$ and $\Delta r$ are based upon prior medical knowledge of lesions that have previously been detected. These values of $m_C$, $m_P$, r and $\Delta r$ can then be substituted into Equation 6 to determine the mean intensity $\mu_I$ for a lesion having the size of the region detected during the step of candidate generation. A value for $\delta_I$ can be determined based upon training data, as discussed below under the heading "Training".

(ii) Shape Model

Most polyps are objects that protrude from the colon wall. In general, polyps have a round shape or contain local spherical elements, whilst colonic folds have an elongated shape. Operators from differential geometry, such as curvatures derived from the Hessian matrix or the structure tensor, have demonstrated the ability to discriminate between round and elongated structures in medical images.

In a preferred example of a method for detecting colonic polyps, two second-order shape features ($F_2$=S) are computed: shape index ($F_2^{SI}$); and second principal curvature flow ($F_2^{k2}$). Both of these features are based upon principal curvatures calculated from the Hessian matrix. Each shape feature is modelled by a truncated Gaussian function, as described in more detail below.

The shape features can be incorporated into the Bayesian framework in different ways. In particular:

1) Polyps can be modelled through shape index (SI) only, such that:

$$P(F_2|X) = P(F_2^{SI}|X) \quad (7)$$

2) Polyps can be modelled through second principal curvature flow (k2) only, such that:

$$P(F_2|X) = P(F_2^{k2}|X) \quad (8)$$

3) Polyps can be modelled through both SI and k2, such that:

$$P(F_2 | X) = P(F_2^{SI} | X) \cdot P(F_2^{k2} | X) \text{ where} \quad (9)$$

$$P(F_2^{SI} | X) = \exp\left(-\frac{(F_2^{SI} - \mu_{SI})^2}{\delta_{SI}^2}\right) \text{ when } F_2^{SI} \leq \mu_{SI},$$

$$P(F_2^{SI} | X) = 1 \text{ when } F_2^{SI} > \mu_{SI},$$

$$P(F_2^{k2} | X) = \exp\left(-\frac{(F_2^{k2} - \mu_{k2})^2}{\delta_{k2}^2}\right) \text{ when } F_2^{k2} \leq \mu_{k2}, \text{ and}$$

$$P(F_2^{k2} | X) = 1 \text{ when } F_2^{k2} > \mu_{k2}.$$

Other suitable features based on differential geometry can also be used in addition to, or instead of, the shape index feature and/or second principal curvature flow feature that are described here in detail.

The way in which shape index and second principal curvature flow are used to model polyps will now be described.

(a) Shape Index Model

The shape index provides a local shape feature at each voxel. Every distinct shape, except for a plane, corresponds to a unique shape index. Shape index values range from 1.0 to 0.0. For example, a shape index of 1.0 corresponds to a spherical cap (i.e. a convex hemisphere, such as the shape of a colonic polyp or lung nodule), a shape index of 0.75 corresponds to a cylindrical shape (such as the shape of colonic fold or a blood vessel), a shape index of 0.5 corresponds to a saddle shape, and a shape index of 0.0 corresponds to a spherical cup (i.e. a concave hemisphere). The volumetric shape index directly characterises the topological shape of an iso-intensity surface in the vicinity of each voxel without explicitly extracting the iso-intensity surface.

The volumetric shape index at voxel x, is defined as:

$$F_2^{SI}(x_i) = \frac{1}{2} - \frac{1}{\pi}\arctan\frac{k_1(x_i) + k_2(x_i)}{k_1(x_i) - k_2(x_i)} \quad (10)$$

where $k_1(x_i)$ and $k_2(x_i)$ are the maximum and minimum principal curvatures, which are defined as:

$$k_1(x_i) = H(x_i) + \sqrt{H^2(x_i) - K(x_i)} \quad (11)$$

$$k_2(x_i) = H(x_i) - \sqrt{H^2(x_i) - K(x_i)} \quad (12)$$

where $K(x_i)$ and $H(x_i)$ are the Gaussian and mean curvatures, respectively, and are defined as:

$$H = \frac{EN - 2FM + GL}{2(EG - F^2)} \quad (13)$$

$$K = \frac{LN - M^2}{EG - F^2} \quad (14)$$

where E, F, G come from the first fundamental form of differential geometry, and L, N, M come from the second fundamental form of differential geometry as:

$$E = 1 + \frac{I_x^2}{I_z^2} \quad (15)$$

$$F = \frac{I_x I_y}{I_z^2} \quad (16)$$

$$G = 1 + \frac{I_y^2}{I_z^2} \quad (17)$$

$$L = \frac{2I_x I_z I_{xz} - I_x^2 I_{zz} - I_z^2 I_{xx}}{R} \quad (18)$$

$$M = \frac{I_x I_z I_{yz} + I_y I_z I_{xz} - I_x I_y I_{zz} - I_z^2 I_{xy}}{R} \quad (19)$$

$$N = \frac{2I_y I_z I_{yz} - I_y^2 I_{zz} - I_z^2 I_{yy}}{R} \quad (20)$$

$$R = I_z^2 |\nabla I| \quad (21)$$

$$|\nabla I|^2 = I_x^2 + I_y^2 + I_z^2 \quad (22)$$

Where I represents the intensity of the scan image, $$I_x = \frac{\partial I}{\partial x}, I_y = \frac{\partial I}{\partial y}, I_z = \frac{\partial I}{\partial z}, I_{xx} = \frac{\partial^2 I}{\partial x^2}, I_{xy} = \frac{\partial^2 I}{\partial x \partial y}, I_{xz} = \frac{\partial^2 I}{\partial x \partial z},$$

$$I_{yy} = \frac{\partial^2 I}{\partial y^2}, I_{yz} = \frac{\partial^2 I}{\partial y \partial z}, I_{zz} = \frac{\partial^2 I}{\partial z^2},$$

and where x, y and z are mutually orthogonal directions in three-dimensional space.

The first and second order derivatives ($I_x$, $I_y$, $I_z$, $I_{xx}$, $I_{xy}$, etc.) can be calculated from an explicit surface representation or can be calculated by numeric differentiation of intensity values in the medical image data. The present invention can be applied to derivatives calculated by either of these methods. Preferably, the first and second partial derivatives of the image are calculated at each voxel, and are substituted into Equations 10 to 22 to calculate the value of the shape index feature $F_2^{SI}$ at each voxel. More specifically, Equation 10 is solved by: calculating the first and second order derivatives of the image (i.e. $I_x$, $I_y$, $I_z$, $I_{xx}$, $I_{xy}$ etc.) at voxel $x_i$; substituting the derivatives into Equations 15 to 22, to derive values of E, F, G, L, M and N; substituting the values of E, F, G, L, M and N into Equations 13 and 14 to derive values of H and K; substituting the values of H and K into Equations 11 and 12 to derive values of $k_1(x_i)$ and $k_2(x_i)$; and substituting the values of $k_1(x_i)$ and $k_2(x_i)$ into Equation 10 to derive a value for $F_2^{SI}(x_i)$.

The shape index feature $F_2^{SI}$ provides rich information that complements the image intensity feature $F_1$. The advantage of defining a feature in terms of its shape index is that shape index can characterise any geometrical shape (except for a plane) as a single unique number. Furthermore, shape index is particularly responsive (i.e. has a value approaching 1.0) to shapes that are spherical and so is particularly well-suited to lesions that have a spherical or partly-spherical shape (such as colonic polyps and lung nodules). For example, given the fact that a polyp is generally either depicted as a hemisphere or has local spherical elements, whereas a fold is usually elongated, the volumetric shape index can be used to detect potential polyp candidates on the colon surface.

(b) Second Principal Curvature Flow Model

Polyps are raised objects protruding from the colon surface, which means that the first and second principal curvatures (i.e. $k_1(x_i)$ and $k_2(x_i)$ as defined in Equations 11 and 12 above) have positive values. In contrast, colonic folds are elongated structures, bent only in one direction, and correspondingly this means that the first principal curvature has a positive value, whereas the second principal curvature is close to zero. Therefore, to detect polyps, a partial differential equation (PDE, or "flow") based on the second principal curvature ($F_2^{k2}$) can be designed which affects only points with a positive second principal curvature and which affects those points in such a way that the second principal curvature decreases. Repeated application of the flow on an image will eventually deform the image such that the second principal curvature becomes less than or equal to zero over the entire image. In other words, the flow will cause the surface protrusion to be gradually removed, and the difference image (i.e. an image indicating the difference in intensity values between each voxel in the original image and the corresponding voxel in the resulting deformed image) indicates the protruding objects (such as potential polyps).

A PDE for updating the image intensity I at voxel $x_i$ can be defined as:

$$\frac{\partial I}{\partial t} = -g(k_1(x_i), k_2(x_i)) \cdot |\nabla I| \qquad (23)$$

where $k_1(x_i)$ and $k_2(x_i)$ are the first and second principal curvatures respectively, $|\nabla I|$ is the gradient magnitude of the input image intensity I, and $g(\cdot)$ is a curvature dependent function characterising the flow.

The aim is to have a small flow on colonic folds, while having a large response on protruding objects (such as polyps) so as to emphasise the protruding objects in the difference image. Therefore, a flow to remove protruding objects can be defined as:

$$\frac{\partial I}{\partial t} = \begin{cases} -k_2(x_i) \cdot |\nabla I| & (k_2(x_i) > 0) \\ 0 & (k_2(x_i) < 0) \end{cases} \qquad (24)$$

Equation 24 can be solved by calculating the first and second order derivatives ($I_x$, $I_y$, $I_z$, $I_{xx}$, $I_{xy}$, etc.) of an image from an explicit surface representation or by numeric differentiation of intensity values in the medical image data, and then substituting the resulting derivatives into Equations 12 to 22 to calculate the values of $k_2$ and $|\nabla I|$ for each voxel. More specifically, the value of $k_2$ is calculated by solving Equation 12, which involves: calculating the first and second order derivatives of the image (i.e. $I_x$, $I_y$, $I_z$, $I_{xx}$, $I_{xy}$ etc.) at voxel $x_i$; substituting the derivatives into Equations 15 to 22, to derive values of E, F, G, L, M and N; substituting the values of E, F, G, L, M and N into Equations 13 and 14 to derive values of H and K; substituting the values of H and K into Equation 12 to derive the value of $k_2(x_i)$. The value of $|\nabla I|$ is calculated by substituting the first order derivatives of the image (i.e. $I_x$, $I_y$, and $I_z$) into Equation 22. The value of $$\frac{\partial I}{\partial t}$$

can then be calculated by substituting the values of $k_2(x_i)$ and $|\nabla I|$ into Equation 24.

The value of $$\frac{\partial I}{\partial t}$$

that is thereby calculated for a particular voxel is then added to the intensity I for that voxel. Since Equation 24 ensures that $$\frac{\partial I}{\partial t}$$

is always less than or equal to zero, adding the value of $$\frac{\partial I}{\partial t}$$

to the intensity of a voxel will result in the intensity decreasing towards zero if $k_2(x_i) > 0$, or being unchanged if $k_2(x_i) < 0$. This process is then reiterated (i.e. the first and second order derivatives are re-calculated using the updated intensity values so as to calculate a new value of $$\frac{\partial I}{\partial t}$$

at each pixel, and the new value of $$\frac{\partial I}{\partial t}$$

is then added to the intensity value that was calculated during the previous iteration).

It is noted that $k_2$ is close to zero on the colonic fold, but has a larger positive value on protruding objects (such as polyps). Thus, based on Equation 24, during each iteration, only at locations of protruding objects, the image intensity is reduced by an amount proportional to the local second principal curvature $k_2$. The iterative process runs until numerical convergence is achieved or the iterative process stops after a pre-set number of iterations if numerical convergence is not achieved. The result of the iterative process is a deformed image. A difference image D is then calculated by subtracting the intensity value at each voxel in the original (input) image from the intensity value at each voxel in the deformed image. The difference image D indicates the amount of protrusion. The difference image is then used as a feature in the Bayesian framework, i.e. $F_2^{k2} = D$.

The feature $F_2^{k2} = D$ can be used to discriminate the polyps from colonic folds by calculating the amount of protrusion irrespective of the actual polyp shape.

The advantage of the second principal curvature flow feature is that it is a "multi-scale" detection algorithm, in the sense that it is capable of detecting potential lesions of a wide range of sizes. In contrast, the shape index feature is a "single scale" detection algorithm, in the sense that in can only detect potential lesions of the particular size that the parameters used to calculate the shape index are optimised to detect. However, the shape index feature is more descriptive of the shape of the lesion than the second principal curvature flow feature. When the second principal curvature flow feature is combined with the shape index feature by means of the Bayesian framework disclosed herein, the resulting combination is capable of detecting and characterising the shapes of a wide range of sizes of lesions.

(iii) Anatomical Model

As mentioned above, anatomical features ($F_3=L$) are very useful for modelling the likelihood of a polyp appearing in different regions in the human anatomy. In polyp detection, two types of anatomical feature can be used:

(a) Distance based on the colon centreline (DC) ($F_3=F_3^C$).

This feature, which will be referred to as the "DC feature", is based on prior medical knowledge that polyps are typically more prevalent in the lower extremities of the colon (i.e., in the rectum and sigmoid) than further up the colon anatomy (towards the caecum).

To calculate the DC feature ($F_3^C$), a centreline of the colon is first extracted based on both the boundary distance transform and seed distance transform. These distance transforms are described in references [9] and [10]. For any point on the centreline, $F_3^C$ is defined as the distance along the colon centreline between the point and the lower extremities of the colon. However, most points in the medical image will not be located exactly on the colon centreline, but will instead be offset from the centreline; for such points, $F_2^C$ is defined as the distance along the centreline between the point on the centreline that is closest to the point in question and the lower extremities of the colon.

A truncated Gaussian function of the DC feature is used to model the probability of the polyp's location:

$$P(F_3 | X) = \exp\left(-\frac{(F_3^C - \mu_{DC})^2}{\delta_{DC}^2}\right) \text{ when } F_3^C > \mu_{DC}, \quad (25)$$

and $P(F_3|X)=1$ when $F_3^C \leq \mu_{DC}$.

$\mu_{DC}$ and $\delta_{DC}$ are the mean and standard deviation, respectively, of the distance (measured along the colon centreline) of polyps in a training set from a common point in the lower extremity of the colon. The way in which values of $\mu_{DC}$ and $\delta_{DC}$ are determined from the training set is discussed below, under the heading "Training". Thus, the values of $\mu_{DC}$ and $\delta_{DC}$ are based upon prior medical knowledge of the distance from the colon centreline of polyps that have previously been detected.

(b) Distance based on the colon mucosal surface (DS) ($F_3=F_3^S$)

This feature, which will be referred to as the "DS feature", is based on the observation that polyps are typically located on or near the mucosal surface. Voxels closer to the colonic surface have a higher probability of being labelled as polyp voxels, compared to voxels further away from the colonic surface.

The boundary distance transform is applied to the segmented colon (i.e. to an image of the colon for which a label has already been associated with each voxel during a candidate generation step) to calculate the DS feature ($F_3^S$). Similar to the DC feature, a truncated Gaussian function of the DS feature is used to model the polyp:

$$P(F_3 | X) = \exp\left(-\frac{(F_3^S - \mu_{DS})^2}{\delta_{DS}^2}\right) \text{ when } F_3^S > \mu_{DS}, \quad (26)$$

and $P(F_3|X)=1$ when $F_3^S \leq \mu_{DS}$.

$\mu_{DS}$ and $\delta_{DS}$ are the mean and standard deviation, respectively, of the distance from the colonic surface of polyps in a training set. The way in which values of $\mu_{DS}$ and $\delta_{DS}$ are determined from the training set is discussed below, under the heading "Training". Thus, the values of $\mu_{DS}$ and $\delta_{DS}$ are based upon prior medical knowledge of the distance from the colonic surface of polyps that have previously been detected.

Modelling the Prior Probability, P(X)

The prior probability P(X) plays an important role in Equation 1. The prior probability can be constrained by spatial information, which can be imposed by a Markov Random Field and Gibbs Random Field (MRF-GRF). The purpose of the MRF-GRF is to allow the Bayesian framework to take into account the neighbourhood of a particular voxel, where the term "neighbourhood" refers to voxels that are near to (and, more particularly, adjacent to) the voxel in question. Lesions have a finite size and tend to be represented by more than one voxel in the medical image data. Thus, if one voxel is labelled as being a polyp, there is a higher probability that each of its adjacent voxels should also be labelled as being a polyp.

The prior probability $p(x_i)$ at voxel $x_i$ is calculated as:

$$p(x_i) = p(r_i = l_1) \approx p(x_i | x_{N_{(i)}}) = \frac{\exp\left[-\sum_c v_c(r_i = l_1)\right]}{\sum_{r_i \in \Lambda} \exp\left[-\sum_c v_c(r_i)\right]} \quad (27)$$

where N(i) is the neighbourhood of voxel i, and $v_c(x_i)$ is a potential function associated with the clique c which is defined as:

$$v_c(r_i=l_1)=-\beta \cdot p(x_i|F) \quad (28)$$

and $$v_c(r_i=l_0)=-\beta \cdot (1-p(x_i|F)) \quad (29)$$

The coefficient β controls the size of clustering, and a suitable value can be determined through trial and error.

From Equation 27, it can be seen that the prior probability of voxel i being a polyp voxel depends on its neighbourhood probability. If the neighbouring voxels are labelled as polyps, this voxel has a higher probability of being labelled as a polyp; otherwise if the neighbouring voxels are labelled as non-polyps, this voxel has a lower probability of being labelled as a polyp.

It is noted that substituting Equation 28 or 29's definitions for $v_c(x_i)$ into Equation 27 leads to the prior probability, $p(x_i)$, being defined in terms of the posterior probability, $p(x_i|F)$. However, the posterior probability, $p(x_i|F)$, is unknown: indeed, the purpose of modelling the prior probability and the likelihood is to calculate a value for $p(x_i|F)$ by means of Equation 1 (or the re-written form of Equation 1 labelled as Equation 2). Thus, the definition for $p(x_i|F)$ given in Equation 2 is substituted into Equation 28 or Equation 29, and Equations 28 or 29 are in turn substituted into Equation 27, such that $p(x_i)$ is defined in terms of itself and the likelihood teams. Values for the likelihood terms, $P(F_1|X)$, $P(F_2|X)$ and $P(F_3|X)$, can be calculated in the manner explained above and, therefore, $p(x_i)$ can then be defined in terms of itself in Equation 27. Equation 27 is then solved iteratively in order to calculate a value for $p(x_i)$. Equation 27 can be solved iteratively using a known expectation-maximisation algorithm, or by using any other suitable algorithm.

It is also noted that the only prior probability in Equation 2 that needs to be calculated is $P(X)$, and there is no need to calculate the other prior probabilities in Equation 2 (i.e. $P(F_1)$, $P(F_2)$ and $P(F_3)$). As rioted previously, $P(X|I,S,L) \propto P(I|X) \cdot P(S,X) \cdot P(L|X) \cdot P(X)$ and so the other prior terms merely affect the constant of proportionality, but do not affect the overall determination as to whether or not a voxel represents a lesion.

Training

Each feature distribution has been modelled in Equations 3 to 27 based on prior medical knowledge. The values of the parameters related to each model are estimated through a training step.

The input to the training step is a training set containing a plurality of 3D medical images in which lesions have been identified and labelled by a clinician. Preferably, the training set contains several hundred 3D scans of colons, containing several hundred polyps. The training set is used to optimise the values of parameters for the intensity model, shape model and anatomical model. An independent testing set may also be used to verify that appropriate parameters have been used and that the Bayesian framework operates satisfactorily.

Each model is associated with one or more probabilities for polyp detection. The parameter values for each model are chosen in order to provide a clinically acceptable cut-off in a receiver operating characteristic (ROC) curve. The parameters whose values can be derived from the training data include: intensity mean ($\mu_I$) and standard deviation ($\delta_I$) for the intensity model; shape mean ($\mu_{SI}$ and/or $\mu_{k2}$) and standard deviation ($\mu_{SI}$ and/or $\delta_{k2}$) for the shape model; mean distance ($\mu_{DC}$ and/or $\mu_{DS}$) and standard deviation of the distance ($\delta_{DC}$ and/or $\delta_{DC}$) for the anatomical model. In this context, a ROC curve is a graph of sensitivity (i.e. the number of lesions detected) against the number of false positives that are detected in each medical image. Any of the models' parameters can be adjusted in order to increase the sensitivity of the model, but increasing the sensitivity also causes an increase in the number of false positives that are detected. Thus, there is a trade-off between sensitivity and the number of false positives: a clinician desires that the sensitivity of the model is sufficiently high to avoid true positives going undetected, but also has a conflicting desire to minimise the number of false positives to reduce the time taken manually reviewing the detected lesions. These conflicting desires are reconciled by adjusting the values of the models' parameters until a clinically acceptable number of false positives per scan is generated. For example, a clinically acceptable sensitivity may be achieved by adjusting the parameters' values until an average of five false positives per scan are generated when the Bayesian framework is used to detect lesions in the training set. The optimal values of the parameters can be found by trial-and-error or by an algorithm that adjusts the parameters' values in order to maximise the area under the ROC curve.

Based on the training set, examples of the optimal parameters for shape models (Equations 7 to 9) are: $\mu_{SI}=0.9$, $\delta_{SI}=1.45$, $\mu_{k2}=235.0$, $\delta_{k2}=50.0$.

Figure 2:
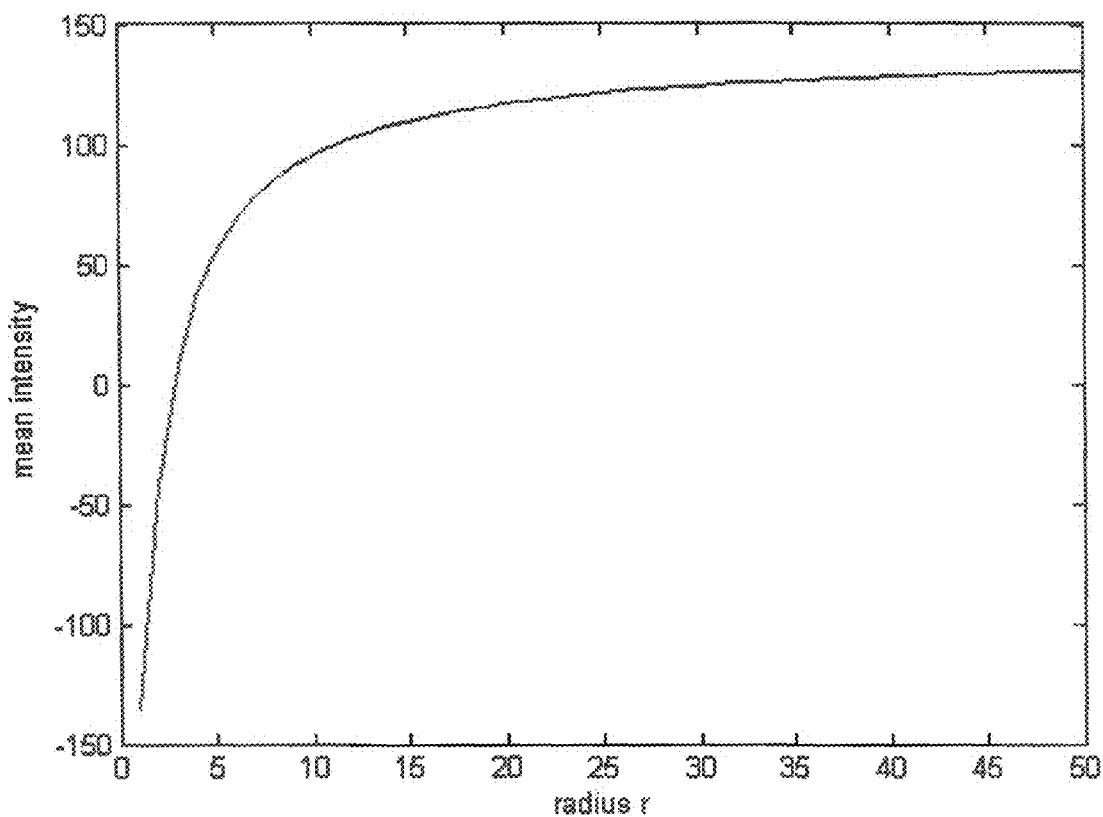
FIG. 2 illustrates the relationship between the mean intensity ($\mu$) and radius (r) of a polyp.

To estimate the optimal mean intensity ($\mu_1$) for the intensity model (Equation 6), polyps in the training set are divided into two groups based on size. Polyps in different groups have different intensity models, wherein the intensity model for the group of large polyps is given by the term $m_c$ in Equation 4, whilst the intensity model for the group of small polyps is given by the term $m_p$ in Equation 4. These intensity models allow estimation of the mean intensities of core part $m_C$ and PVE part $m_P$. FIG. 2 shows the relationship between the mean intensity ($\mu$) of the polyp and radius (r) (Equation 6), obtained from the training data.

For example, polyps in the inventors' training data were divided into two groups depending on whether the diameter of the polyp was greater or less than five millimetres, and values of $\Delta r=0.25$, $m_c=140$, $m_p=-175$ were calculated from the training data. These parameters provide optimal detection performance from the intensity model on the training data.

Candidate Generation

The Bayesian framework disclosed herein combines various features (for example, intensity, shape and anatomical features) into a single statistical expression (see Equation 2), which can be applied to detect lesions including colonic polyps in CTC volumes. The Bayesian framework can be used in either, or both, of the two main steps of a CAD system, i.e. initial candidate generation and/or false positive reduction.

The use of the Bayesian framework in a method of candidate generation will now be described. In this method, the Bayesian framework is used to identify structures in the medical image that might be polyps. This method can also be used to segment the image (i.e. to divide the image into different parts) and label each segment. For example, the different voxels within the image can be labelled as containing a polyp or as containing healthy tissue.

Figure 3:
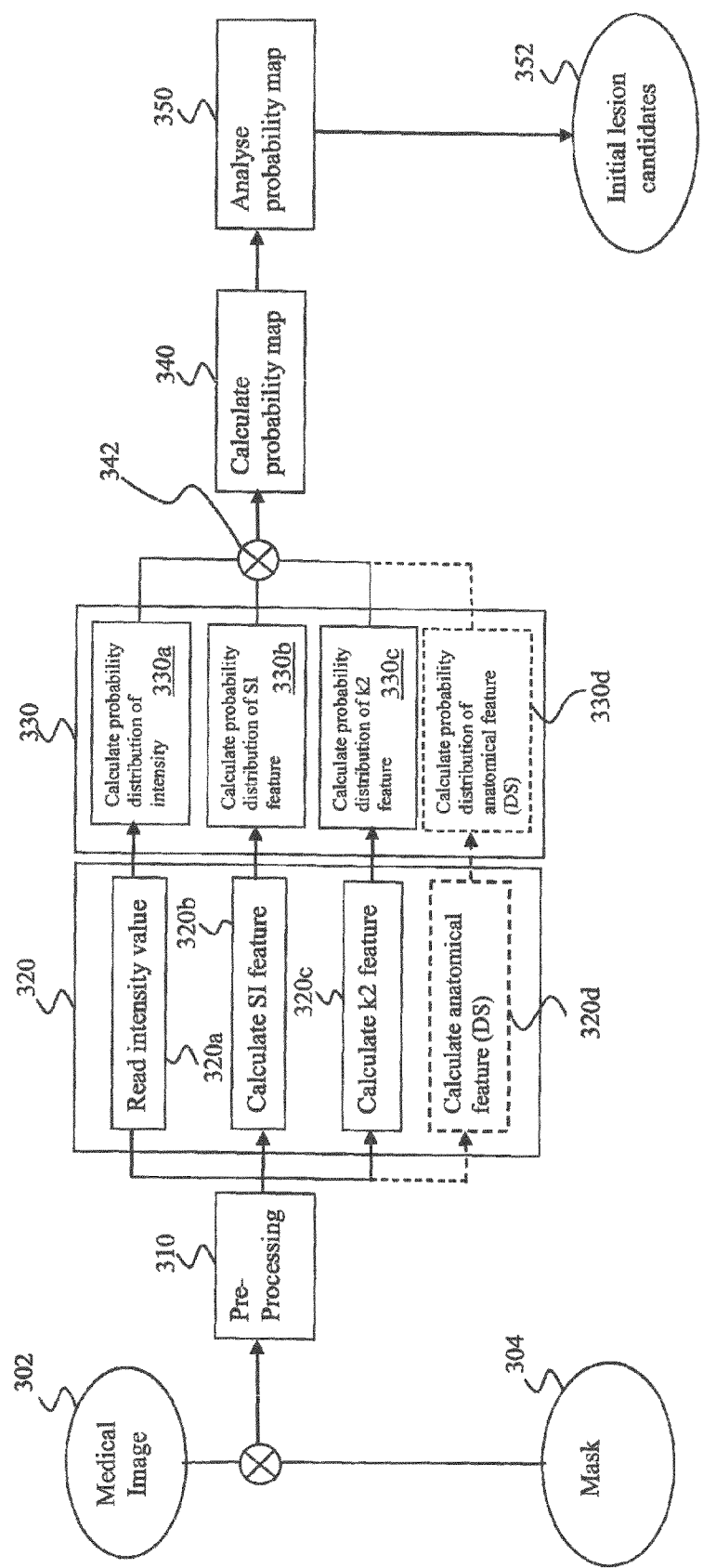
FIG. 3 is a flow chart of a method of candidate generation.

FIG. 3 is a flow chart illustrating a method of candidate generation using the Bayesian framework. The inputs to the method are a three-dimensional medical image 302 and a mask 304. The method may comprise a step (not shown in FIG. 3) of receiving a three-dimensional medical image 302 and/or a mask 304. The mask 304 comprises data that indicates whether a particular voxel is part of a region of interest within the medical image 302 and, therefore, whether that voxel is to be analysed by the method of candidate generation. Hence, the mask 304 avoids unnecessary computation being performed upon voxels that are outside the region of interest and which are unlikely to contain any candidates. In the method of candidate generation, the mask 304 usually contains data that indicates whether a particular voxel represents part of the organ of interest (such as the colon) or whether the voxel is external to the organ. The mask 304 can be generated using any suitable method, such as by using a known fuzzy thresholding algorithm.

In step 310, a pre-processing algorithm is preferably applied to the three-dimensional medical image 302. The pre-processing algorithm allows the features F to be calculated more accurately. The pre-processing algorithm is preferably applied to the whole of the three-dimensional image 302 but, alternatively, could be applied only to the portion of the image 302 that the mask 304 indicates to be the region of interest. Any suitable pre-processing algorithm may be used. For example, the image data may be pre-processed using an algorithm that reduces noise in the image. In another example, a known smoothing algorithm can be used. The purpose of the smoothing algorithm is to smooth the spatial derivatives of the intensity values at each voxel in the 3D image, wherein a derivative is said to be "smooth" if it contains no discontinuities or points at which it is undefined.

In a preferred example, a single-scale Gaussian smoothing algorithm is used to remove noise. Single-scale Gaussian smoothing is described in reference [11]. Gaussian smoothing is advantageous because it is a particularly simple smoothing algorithm and, therefore, requires little computational effort. In other preferred examples, an isotropic diffusion algorithm or an anisotropic diffusion algorithm may be used. An anisotropic diffusion algorithm is particularly advantageous because it preserves the "edges" between high and low intensity regions.

In step 320, the value of each feature is determined for each voxel $x_i$. Each voxel $x_i$ is within the portion of the image 302 that the mask 304 indicates to be the region of interest. In the example in which the method is used to detect colonic polyps, the values of the features are determined in the following manner:

(i) In step 320a, the value of the intensity feature $F_1$ is determined by reading the intensity value I of voxel $x_i$ from the medical image 302.

(ii) In step 320b, the value of the shape index feature $F_2^{SI}$ is determined by solving Equation 10.

(iii) In step 320c, the value of the second principal curvature flow feature $F_2^{k2}$ is determined by generating a difference image, in the manner described above. The value of the second principal curvature flow feature $F_2^{k2}$ at voxel $x_i$ is equal to the value of the difference image at the corresponding voxel.

(iv) In step 320d, the value of the DS anatomical feature $F_3^S$ is determined by calculating the distance of the voxel from the colon mucosal surface. The use of an anatomical feature is optional, as denoted by the dashed lines in FIG. 3.

In step 330, the likelihood probability distribution of each feature is calculated for each voxel $x_i$. The likelihood probability distributions are calculated based on the values of the features calculated in step 320 and prior medical knowledge (such as training data). In the example in which the method is used to detect colonic polyps, the likelihood probability distributions of the features are determined in the following manner:

(i) In step 330a, the intensity probability distribution $P(F_1|X)$ is calculated by solving Equation 3. When solving Equation 3, the value I is the intensity value of the voxel $x_i$ and the value of $\delta_I$ is derived from the training data. A fixed mean intensity is used. The fixed mean intensity is preferably calculated based on the training data. For example, Equation 3 may be solved by assuming that $\mu_I$ is equal to 66.7 at each voxel within the mask.

(ii) In step 330b, a shape probability distribution $P(F_2|X)$ that is based upon the shape index feature $F_2^{SI}$ alone is calculated by solving Equation 7. Similarly, in step 330c, a shape probability distribution $P(F_2|X)$ that is based upon the second principal curvature flow feature $F_2^{k2}$ alone is calculated by solving Equation 8. Alternatively, a shape probability distribution $P(F_2|X)$ that is based upon both the shape index feature $F_2^{SI}$ and the second principal curvature flow feature $F_2^{k2}$ can be calculated by solving Equation 9, which effectively conflates steps 330b and 330c. When solving equations 7, 8 or 9, the values of the shape index feature $F_2^{SI}$ and/or the second principal curvature flow feature $F_2^{k2}$ for voxel $x_i$ that were calculated in steps 320b and 320c are used. The values of $\mu_{SI}$, $\delta_{SI}$, $\mu_{k2}$ and $\delta_{k2}$ that were calculated from the training data are also used when solving Equations 7, 8 and 9.

(iii) In step 330d, the anatomical probability distribution $P(F_3|X)$ is calculated by solving Equation 26. The use of an anatomical probability distribution is optional, as denoted by the dashed lines in FIG. 3.

In step 340, a conditional probability map is generated. The conditional probability map is a three-dimensional array having a plurality of elements each corresponding to a respective voxel in the medical image, wherein each element of the array contains a value indicating the probability that the voxel to which it corresponds represents a polyp. The probability map is calculated by performing the following sub-steps (which are not individually illustrated in FIG. 3) for each voxel $x_i$:

(i) The prior probability is calculated by solving Equation 27.

(ii) The conditional probability of voxel $x_i$ labelled as $l_1$ is calculated by solving Equation 1, using the probability distributions calculated in step 330. Hence, Equation 1 uses Bayes' law (illustrated by reference numeral 342 in FIG. 3) to combine each of the probability distributions, so as to generate a single value indicating the probability that voxel $x_i$ contains the object (such as a colonic polyp) that is to be detected. In the example in which the method is used to detect colonic polyps, Equation 2 is solved; it will be recalled that Equation 2 is simply a re-written form of Equation 1 when there are three conditionally independent features, $F_1$, $F_2$, $F_3$, as is the case for the method of detecting colonic polyps.

In step 350, the probability map is analysed to identify candidates 352 (such as polyp candidates) in the three-dimensional image. In an example, step 350 comprises the following sub-steps, which are not individually illustrated in FIG. 3:

(i) A binary image is obtained by thresholding on the probability map. That is, the probability at each element in the probability map is compared with a predetermined threshold probability, such that each voxel in a three-dimensional binary image is assigned a value of one if the corresponding probability in the probability map is greater than the predetermined threshold probability, or assigned a value of zero otherwise. The value of the predetermined threshold probability is chosen in order to give a clinically acceptable cut-off in a ROC curve, i.e. in order that a clinically acceptable average number of false positives are generated for each scan in the training set.

(ii) A group of three-dimensional regions is generated by 3D labelling on the binary image. To put this another way, a label $l_i$ is associated with each voxel $x_i$ in the binary image, depending on whether the value of that voxel is one or zero.

(iii) Small regions are removed from the binary image. That is, any three-dimensional regions having fewer contiguous voxels than a predetermined threshold are discarded. The predetermined threshold is selected based upon medical knowledge of the size of the object to be detected. For example, if a contiguous region is smaller than the size of a colonic polyp, then it is assumed that the region has been erroneously labelled as a polyp (for example, due to the presence of noise in the medical image) rather than because those voxels represent a polyp candidate.

The three-dimensional regions that remain after the small regions have been removed are the lesion candidates 352. The probability map may be analysed in step 350 using different sub-steps from those described above.

The method may comprise a further step (not shown in FIG. 3) of outputting data relating to the detected lesion candidates. For example, a map indicating the locations of the lesion candidates may be displayed graphically, or data indicating the locations of the lesion candidates may be output to a method of false positive reduction (such as that described below with reference to FIG. 4).

Image Segmentation

The method for candidate generation described herein can also be used for image segmentation. The term "image segmentation" refers to a method of dividing an image into a number of different regions. It is useful to be able to segment a medical image into regions that contain lesions and regions that do not contain lesions. During the step of candidate generation, it is acceptable to detect only a few voxels within each region that contains a lesion. However, during image segmentation, it is necessary to detect substantially all of the voxels that contain a lesion, in order that the full extent of the lesion can be determined.

The method for candidate generation described herein is particularly suitable for image segmentation because the potential lesion candidates are calculated from the joint statistics of multi-features in the posterior probability (Equation 1), which provides rich information for proper lesion segmentation. The experimental results described under the heading "Experimental results" below (and illustrated in FIGS. 7(g1) and (g2) and FIGS. 8(g1) and (g2)) demonstrate the efficacy of the method for both candidate generation and lesion segmentation.

False Positive Reduction

The Bayesian framework disclosed herein can also be used in a method of false positive reduction, in order to remove false positive regions from initial lesion candidates. Those initial candidates can be obtained from other methods for detecting lesion candidates (including known methods for detecting lesion candidates based on the shape of structures in a medical image) or they can be obtained using the Bayesian framework itself, as described above.

The method of false positive reduction is similar to that described above for candidate generation. However, instead of calculating a probability map within the whole colon mask as for candidate generation, in the method of false positive reduction the probability map is calculated within each region $R_{ini}^i$ of the image that contains initial lesion candidates, where i=1 . . . N, and N is the total number of initial lesion candidates.

Figure 4:
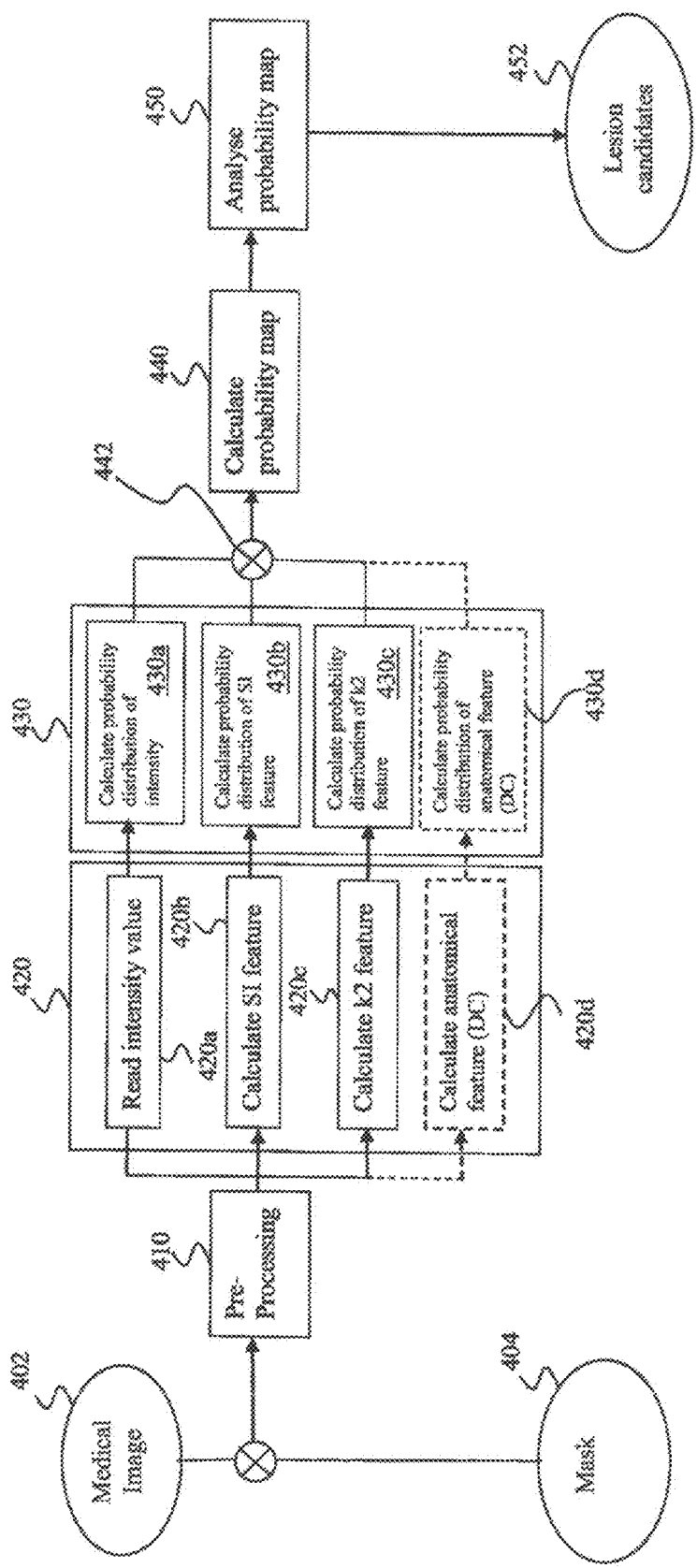
FIG. 4 is a flow chart of a method of false positive reduction.

FIG. 4 is a flow chart illustrating a method of false positive reduction using the Bayesian framework. The inputs to the method are a three-dimensional medical image 402 and a mask 404. The method may comprise a step (not shown in FIG. 4) of receiving a three-dimensional medical image 402 and/or a mask 404.

In step 410, a pre-processing algorithm is preferably applied to the three-dimensional medical image 302. This step is essentially the same as step 310 of the method for candidate generation, and so need not be described in detail.

In step 420, the value of each feature is determined for each voxel $x_i$. Each voxel x, is within the region $R_{ini}^i$ of the three-dimensional medical image 402 that contains the initial lesion candidates. The region $R_{ini}^i$ is defined by a mask 404. In the example in which the method is used to detect colonic polyps, the values of the features are determined in the following manner:

(i) In step 420a, the value of the intensity feature $F_1$ is determined by reading the intensity value I of voxel $x_i$ from the medical image 402.

(ii) In step 420b, the value of the shape index feature $F_2^{SI}$ is determined by solving Equation 10.

(iii) In step 420c, the value of the second principal curvature flow feature $F_2^{k2}$ is determined by generating a difference image, in the manner described above. The value of the second principal curvature flow feature $F_2^{k2}$ at voxel $x_i$ is equal to the value of the difference image at the corresponding voxel.

(iv) In step 420d, the value of the DC anatomical feature $F_3^S$ is determined by calculating the distance of the voxel along the colon centreline. The use of an anatomical feature is optional, as denoted by the dashed lines in FIG. 4.

In step 430, the likelihood probability distribution of each feature is calculated for each voxel $x_i$. The likelihood probability distributions are calculated based on the values of the features calculated in step 420 and prior medical knowledge (such as training data). In the example in which the method is used to detect colonic polyps, the likelihood probability distributions of the features are determined in the following manner:

(i) In step 430a, the intensity probability distribution $P(F_1|X)$ is calculated by solving Equation 3. When solving Equation 3, the value I is the intensity value of the voxel $x_i$, the mean intensity $\mu_I$ is defined as a function of the size of the initial candidate region $R_{ini}^i$ by solving Equation 6, and the value of $\delta_I$ is derived from the training data.

(ii) In step 430b, a shape probability distribution $P(F_2|X)$ that is based upon the shape index feature $F_2^{SI}$ alone is calculated by solving Equation 7. Similarly, in step 430c, a shape probability distribution $P(F_2|X)$ that is based upon the second principal curvature flow feature $F_2^{k2}$ alone is calculated by solving Equation 8. Alternatively, a shape probability distribution $P(F_2|X)$ that is based upon both the shape index feature $F_2^{SI}$ and the second principal curvature flow feature $F_2^{k2}$ can be calculated by solving Equation 9, which effectively conflates steps 430b and 430c. When solving equations 7, 8 or 9, the values of the shape index feature $F_2^{SI}$ and/or the second principal curvature flow feature $F_2^{k2}$ for voxel $x_i$ that were calculated in steps 420b and 420c are used. The values of $\mu_{SI}$, $\delta_{SI}$, $\mu_{k2}$ and $\delta_{k2}$ that were calculated from the training data are also used when solving Equations 7, 8 and 9.

(iii) In step 430d, the anatomical probability distribution $P(F_3|X)$ is calculated by solving Equation 25. It will be recalled that Equation 25 results in voxels along the centreline closer to the lower extremities of the colon having a high probability of being labelled as polyp. The use of an anatomical probability distribution is optional, as denoted by the dashed lines in FIG. 4.

In step 440, a conditional probability map is generated for each voxel x, within the region $R_{ini}^i$. This step is essentially the same as step 340 of the method for candidate generation, and so need not be described in detail.

In step 450, the probability map is analysed to identify candidates 452 (such as polyp candidates) in the three-dimensional image. In an example, step 450 comprises the following sub-steps, which are not individually illustrated in FIG. 4:

(i) A binary image is obtained by thresholding on the probability map. This step is performed in the same way as the corresponding sub-step of step 350 described above.

(ii) A group of three-dimensional regions $R_{prob}^j$ is obtained by 3D labelling on the binary image to obtain group of 3D regions $R_{prob}^j$, where j=1 . . . M and M is the total number of regions with higher probability values in the probability map.

(iii) If the initial region contains at least one region $R_{prob}^j$ and the size of the region $R_{prob}^j$ is larger than a pre-set threshold, namely, $R_{prob}^j \subset R_{ini}^i$, then the initial region $R_{ini}^i$ is kept as a potential lesion region. Otherwise, the region is removed from the initial candidates.

Hence, step 450 reduces false positives in the set of initial lesion candidates by discarding lesion candidates that have a low probability of being lesions. The probability map may be analysed in step 450 using different sub-steps from those described above.

The method may comprise a further step (not shown in FIG. 4) of outputting data relating to the detected lesions that remain after false positives have been discarded. For example, a map indicating the locations of the remaining detected lesions may be displayed graphically.

As mentioned above, when the Bayesian framework is used in a method of candidate generation, a comparatively large portion (as defined by the mask 304, which typically includes an entire organ) of the three-dimensional image is processed, which involves high memory usage. In contrast, when the Bayesian framework is used in a method of false positive reduction, only the comparatively small candidate region of the three-dimensional image is processed, which requires less memory. Thus, the Bayesian framework is particularly advantageous when used in a method of false positive reduction. However, in the case of using the Bayesian framework for false positive reduction, the overall sensitivity of lesion detection depends on the sensitivity of the initial candidate generation, so lesions missed by the step of initial candidate generation cannot be detected by the step of false positive reduction. That is, the Bayesian based false positive reduction stage is only able to remove false positive regions whereas, in the case of using the Bayesian method for initial candidate generation, the overall sensitivity of lesion detection depends on the Bayesian based candidate generation. This is one advantage of using the Bayesian framework for initial candidate generation.

It is noted that the intensity and anatomical models have slight differences depending on whether they are used for candidate generation or for false positive reduction. In the case of candidate generation, a fixed mean intensity $\mu_I$ is used in Equation 3 and the DS feature can be used in the anatomical modelling (Equation 26). In the case of false positive reduction, the mean intensity $\mu_I$ is a function of the region size (Equation 6) and the DC feature can be used in the anatomical modelling (Equation 25). However, the DC and DS features can be used in any appropriate combination. More particularly: the DS feature could be used during candidate generation; the DC feature could be used during false positive reduction; or both the DC and DS features could be used during candidate generation and/or false positive reduction.

Apparatus

An example of the apparatus used to implement the invention will now be described with reference to FIGS. 5 and 6. As shown in FIG. 5, a scan image may be created by a computer 504, which receives scan data from a scanner 502 and constructs the scan image. The scan image is saved as an electronic file or a series of files, which are stored on a storage medium 506, such as a fixed or removable disc. The scan image may include metadata associated with the scan image. The scan image may be analysed by the computer 504, or the scan image may be transferred to another computer 508 which runs software for processing the scan image in order to perform the method described above. The software may be stored on a carrier, such as a removable disc or a solid-state memory, or downloaded over a network such as a local area network (LAN), wide-area network (WAN), an intranet or the Internet.

The computers described herein may be computer systems 600 as shown in FIG. 6. Embodiments of the present invention may be implemented as programmable code for execution by the computer system 600. After reading this description, it will become apparent to a person skilled in the art how to implement the invention using other computer systems and/or computer architectures.

Computer system 600 includes one or more processors, such as processor 604. Processor 604 may be any type of processor, including but not limited to a special purpose or a general-purpose digital signal processor. Processor 604 is connected to a communication infrastructure 606 (for example, a bus or network). Computer system 600 also includes a main memory 608, preferably random access memory (RAM), and may also include a secondary memory 610. Secondary memory 610 may include, for example, a hard disk drive 612 and/or a removable storage drive 614, representing a floppy disk drive, a magnetic tape drive, an optical disk drive, etc. Removable storage drive 614 reads from and/or writes to a removable storage unit 618 in a well-known manner. Removable storage unit 618 represents a floppy disk, magnetic tape, optical disk, etc., which is read by and written to by removable storage drive 614. As will be appreciated, removable storage unit 618 includes a computer readable storage medium having stored therein computer software and/or data.

In alternative implementations, secondary memory 610 may include other similar means for allowing computer programs or other instructions to be loaded into computer system 600. Such means may include, for example, a removable storage unit 622 and an interface 620. Examples of such means may include a program cartridge and cartridge interface (such as that previously found in video game devices), a removable memory chip (such as an EPROM, or PROM, or flash memory) and associated socket, and other removable storage units 622 and interfaces 620 which allow software and data to be transferred from removable storage unit 622 to computer system 600. Alternatively, the program may be executed and/or the data accessed from the removable storage unit 622, using the processor 604 of the computer system 600.

Computer system 600 may also include a communication interface 624. Communication interface 624 allows software and data to be transferred between computer system 600 and external devices. Examples of communication interface 624 may include a modem, a network interface (such as an Ethernet card), a communication port, a Personal Computer Memory Card International Association (PCMCIA) slot and card, etc. Software and data transferred via communication interface 624 are in the form of signals 628, which may be electronic, electromagnetic, optical, or other signals capable of being received by communication interface 624. These signals 628 are provided to communication interface 624 via a communication path 626. Communication path 626 carries signals 628 and may be implemented using wire or cable, fibre optics, a phone line, a wireless link, a cellular phone link, a radio frequency link, or any other suitable communication channel. For instance, communication path 626 may be implemented using a combination of channels.

The terms "computer program medium" and "computer readable medium" are used generally to refer to media such as removable storage drive 614, a hard disk installed in hard disk drive 612, and signals 628. These computer program products are means for providing software to computer system 600. However, these terms may also include signals (such as electrical, optical or electromagnetic signals) that embody the computer program disclosed herein.

Computer programs (also called computer control logic) are stored in main memory 608 and/or secondary memory 610. Computer programs may also be received via communication interface 624. Such computer programs, when executed, enable computer system 600 to implement the present invention as discussed herein. Accordingly, such computer programs represent controllers of computer system 600. Where the invention is implemented using software, the software may be stored in a computer program product and loaded into computer system 600 using removable storage drive 614, hard disk drive 612, or communication interface 624, to provide some examples.

In alternative embodiments, the invention can be implemented as control logic in hardware, firmware, or software or any combination thereof.

Experimental Results

The Bayesian framework disclosed herein has been evaluated on CT colon images. Experiments have been conducted to demonstrate the effectiveness of the algorithm applied to both the initial candidate generation step and the false positive reduction step.

In the first experiment, the Bayesian framework was used in a method of initial polyp candidate detection as described above with reference to the flow chart shown in FIG. 3. In this experiment, both the shape index feature and the second principal curvature flow (k2) feature (but not their combination) were considered in the shape modelling.

Figure 7:
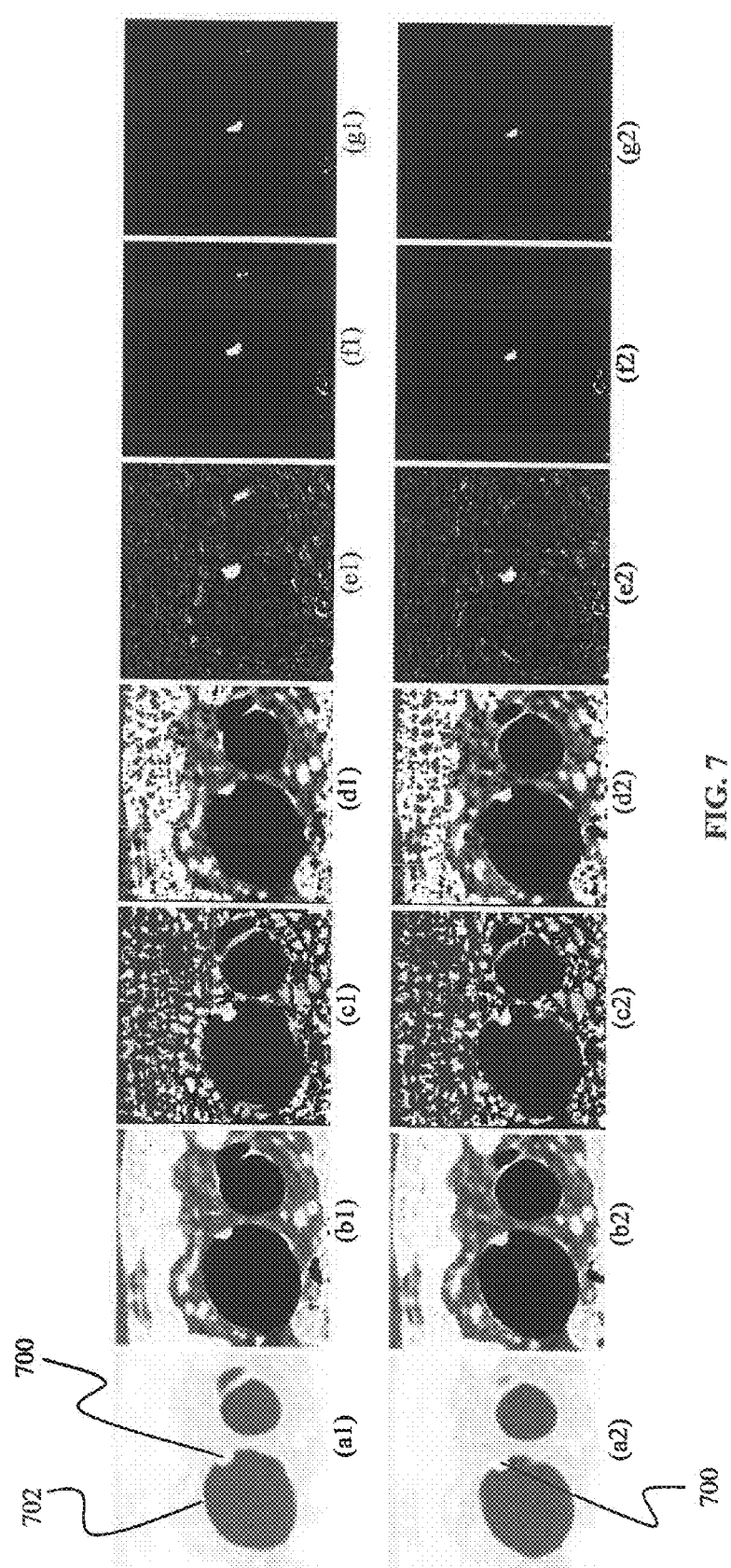
FIGS. 7 and 8 illustrate the results of detecting polyps in medical image data.

FIG. 7 shows an example of polyp detection from the first experiment, in which: (a1) and (a2) show a CT image of a polyp 700 on two continuous sub-slices; (b1) and (b2) show the intensity probability map for each sub-slice; (c1) and (c2) show the shape index probability map for each sub-slice; (d1) and (d2) show the joint probability map for each sub-slice based on the intensity feature and the shape index feature; (e1) and (e2) show the k2 difference image D for each sub-slice; (f1) and (f2) show the k2 probability map for each sub-slice; and (g1) and (g2) show the thresholded image from the joint probability map for each slice based on the intensity feature and the k2 feature. It can be seen that both the intensity map ((b1) and (b2)) and the shape index map ((e1) and (c2)) highlight (or emphasise) the polyp 700. However, compared with the shape index probability map ((e1) and (c2)), the k2 probability map ((f1) and (f2) shows better performance with fewer false regions. It can be seen from the final thresholded images of (g1) and (g2) that the boundary of the polyp 700 is properly segmented from the colonic wall 702. That is, (g1) and (g2) show only the polyp 700, and do not show any other features in the original images (a1) and (a2), thus demonstrating that the Bayesian framework disclosed herein is effective in identifying lesions in three-dimensional medical images.

In the second experiment, the Bayesian framework was used in a method of false positive reduction as described above with reference to the flow chart shown in FIG. 4. In this experiment, one of the inventors' own previous algorithms for automatic CT colonic polyp detection (described in reference [1]) was used to generate the initial polyp candidates. The inventors' previous algorithm produces a relatively small number of potential lesion regions. The aim of this experiment was to use the Bayesian method on all the potential lesion regions to remove false regions.

Figure 8:
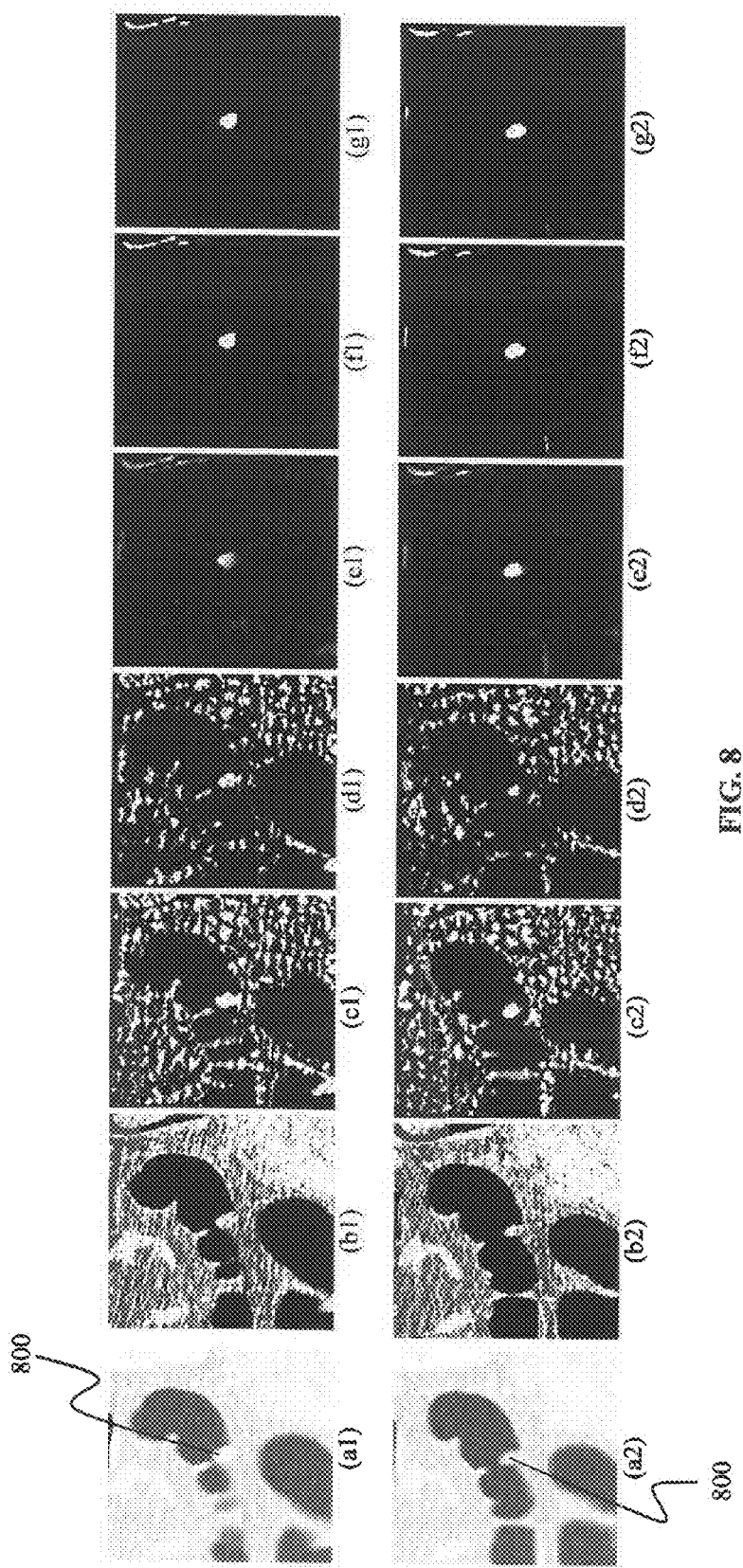

FIG. 8 shows example of polyp detection from the second experiment, in which: (a1) and (a2) show a CT image of a polyp 800 on two continuous sub-slices; (b1) and (b2) show the intensity probability map for each sub-slice; (c1) and (c2) show the shape index probability map for each sub-slice; (d1) and (d2) show the joint probability map for each sub-slice based on the intensity feature and the shape index feature; (e1) and (e2) show the k2 difference image D for each sub-slice; (f1) and (f2) show the k2 probability map for each sub-slice; and (g1) and (g2) show the thresholded image from the joint probability map for each slice based on the intensity feature and the k2 feature.

Figure 9:
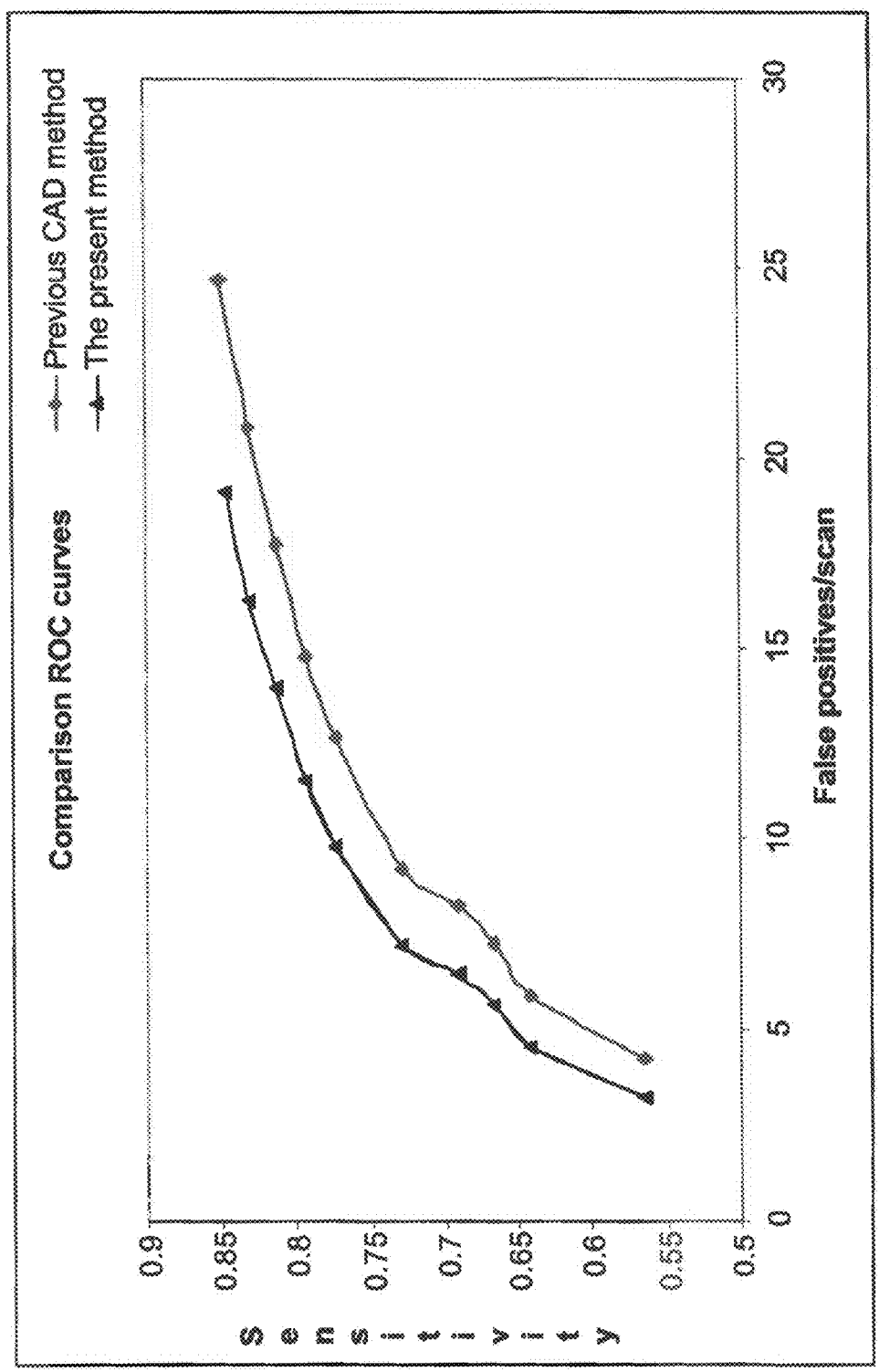
FIG. 9 illustrates receiver operating characteristic curves for a known CAD algorithm and for the method disclosed herein.

FIG. 9 shows a receiver operating characteristic (ROC) curve for 134 CT colonic scans based on the inventors' previous CAD algorithm only (see the bottom curve in FIG. 9) and the improved ROC curve resulting from further false positive reduction using the Bayesian method disclosed herein (see the top curve in FIG. 9). It can be seen that the polyp detection performance using the Bayesian method is greatly improved, with regard to both sensitivity and false positives, compared with the detection performance obtained from the inventors' previous CAD algorithm.

Alternative Embodiments

The Bayesian framework may be used to detect other types of lesions in addition to colonic polyps including, but not limited to, lung nodules, liver lesions, mammographic masses and brain lesions. Features appropriate to the type of lesion to be detected can be used instead of the particular intensity, shape and anatomical features that are described in detail above. In particular, the anatomical feature may be replaced or supplemented by a different model that reflects prior medical knowledge of the type of lesion to be detected, such as prior medical knowledge regarding the probability of a lung nodule or brain lesion being located in a particular region. Whilst the use of an anatomical feature that is based upon the location of a lesion (such as the distance from the rectum or submucosal surface) is appropriate to detecting colonic polyps, other types of feature that are not based upon the location of a lesion may be used. For example, anatomical features may include features that are based on the size, shape or density of the particular type of lesion that is to be detected.

It will be understood that the invention has been described above purely by way of example, and that modifications of detail can be made within the scope of the invention.

References

The following publications, which may assist the reader in gaining an appreciation of certain examples disclosed herein, are herein incorporated by reference in their entirety:

[1] G. Slabaugh, X. Yang, X. Ye, R. Boyes, G. Beddoe. A Robust and Fast System for CTC Computer-Aided Detection of Colorectal Lesions. Algorithms, 2010, 3, pp. 21-43.

[2] P. Viola and M. J. Jones, "Robust Real-Time Face Detection," International Journal of Computer Vision 57(2), 137-154, 2004.

[3] R. M. Haralick, K. Shanmugam, and I. Dinstein, "Textural Features for Image Classification," IEEE Trans. On Systems, Man, and Cybernetics, 3(6), 1973.

[4] D. S. Paik, C. F. Beaulieu, G. D. Rubin, B. Acar, R. B. Jeffrey, J. Yee, J. Dey, S. Napel, "Surface Normal Overlap: A Computer-Aided Detection Algorithm With Application to Colonic Polyps and Lung Nodules in Helical CT," IEEE Trans. on Medical Imaging, 23(6), 2004.

[5] H. Kobatake, M Murakami, "Adaptive Filter to Detect Rounded Convex Regions: Iris Filter", International Conference on Pattern Recognition, 1996.

[6] H. Yoshida and J. Nappi, "Three-Dimensional Computer-Aided Diagnosis Scheme for Detection of Colonic Polyps," IEEE Trans. on Medical Imaging, 20(12), 2001.

[7] M. P. DoCarmo, Differential Geometry of Curves and Surfaces, First Edition, Prentice Hall, 1976.

[8] J. J. Koenderink, Solid Shape, First Edition, MIT Press, 1990.

[9] G. Lohmann, Volumetric Image Analysis. New York: Wiley, 1998.

[10] Y. Zhou, and A. W. Toga. "Efficient skeletonization of volumetric objects," IEEE Transactions on Visualization and Computer Graphics, vol. 5, no. 3, pp. 197-209, 1999.

[11] Jain, Fundamentals of Image Processing, First Edition, Prentice Hall, 1989.

The invention claimed is:

1. A method for detecting an object in a three-dimensional medical image, comprising:

determining, by a processing device, from data representing the three-dimensional medical image, for each voxel in a portion of the three-dimensional medical image, values of a plurality of features at the voxel, wherein each feature at the voxel characterizes a respective property of the three-dimensional medical image at the voxel;

calculating, by the processing device, a likelihood probability distribution of each feature based on the determined values of the feature and a parameter value derived from training data;

generating, by the processing device, a probability map that indicates a probability of each voxel in the portion of the three-dimensional medical image containing an object to be detected, wherein said generating a probability map includes combining, using Bayes' law, the likelihood probability distributions of the plurality of features at each respective voxel of the portion of the three-dimensional medical image;

detecting, by the processing device, the object in the portion of the three-dimensional medical image based on the probability map; and outputting, by the processing device, an indication of the detected object.

2. The method of claim 1, wherein said calculating a likelihood probability distribution of a feature includes selecting a parameter value that generates a predetermined number of false positives in response to performing the method on the training data.

3. The method of claim 1, wherein the plurality of features includes an appearance feature.

4. The method of claim 3, wherein the appearance feature comprises image intensity information derived from the three-dimensional medical image.

5. The method of claim 3, wherein the appearance feature comprises a wavelet feature derived from the three-dimensional medical image.

6. The method of claim 3, wherein the appearance feature comprises a texture feature derived from the three-dimensional medical image.

7. The method of claim 1, wherein the plurality of features includes a shape feature.

8. The method of claim 7, wherein the shape feature includes a first-order shape feature derived from the three-dimensional medical image.

9. The method of claim 7, wherein the shape feature includes a second-order shape feature.

10. The method of claim 9, wherein the second-order shape feature is determined from a Hessian matrix.

11. The method of claim 10, wherein the second-order shape feature is calculated from eigenvalues of the Hessian matrix.

12. The method of claim 9, wherein the second-order shape feature represents a volumetric shape index of the three-dimensional medical image at a respective voxel.

13. The method of claim 9, wherein the second-order shape feature represents a second principal curvature flow of the three-dimensional medical image at a respective voxel.

14. The method of claim 1, further comprising calculating a spatial prior probability.

15. The method of claim 14, wherein said generating a probability map further comprises combining, using Bayes' law, the likelihood probability distributions and the spatial prior probability.

16. The method of claim 15, wherein the spatial prior probability comprises a spatial constraint.

17. The method of claim 16, wherein the spatial constraint is imposed by a Markov Random Field and a Gibbs Random Field.

18. The method of claim 1, wherein calculating a likelihood probability distribution of a feature at a voxel comprises calculating a value of a Gaussian function at the voxel, and wherein the Gaussian function models the probability distribution of the feature.

19. The method of claim 18, wherein the Gaussian function models the probability distribution of a feature that characterises the intensity of the three-dimensional medical image, and wherein said calculating a value of a Gaussian function includes treating a mean intensity in the Gaussian function as a fixed value.

20. The method of claim 18, wherein the Gaussian function models the probability distribution of a feature that characterises the intensity of the three-dimensional medical image, and wherein said calculating a value of a Gaussian function includes calculating a mean intensity in the Gaussian function as a function of a size of a previously-detected object.

21. The method of claim 20, wherein said calculating a mean intensity in the Gaussian function as a function of a size of a previously-detected object includes calculating an expression that is based upon the presence of a partial volume effect in the three-dimensional medical image.

22. The method of claim 1, wherein the plurality of features includes an anatomical feature.

23. The method of claim 22, further comprising determining a value of an anatomical feature, wherein said determining a value of an anatomical feature includes calculating a colon centreline.

24. The method of claim 22, wherein said determining a value of an anatomical feature includes calculating a colon boundary distance transform.

25. The method of claim 1, wherein said detecting the object in the three-dimensional medical image comprises performing thresholding on the probability map and labelling regions in the thresholded probability map.

26. The method of claim 1, further comprising defining the portion of the three-dimensional medical image using a mask.

27. The method of claim 1, wherein said detecting the object comprises detecting a region within the portion of the three-dimensional medical image having an intensity and a size that are within a predetermined intensity range and size range of a type of target object.

28. The method of claim 1, wherein the method is used in a candidate generation step of a computer aided detection algorithm.

29. The method of claim 1, wherein said detecting the object in the three-dimensional medical image includes determining from the probability map whether a previously-detected object is a false positive.

30. The method of claim 1, further comprising segmenting the three-dimensional medical image based upon a result of detecting the object in the portion of the three-dimensional medical image.

31. A computer-readable storage medium having stored thereon computer-executable instructions, execution of which by a processing device causes the processing device to perform operations for detecting an object in a three-dimensional medical image, the operations comprising:

determining, from data representing the three-dimensional medical image, for each voxel in a portion of the three-dimensional medical image, values of a plurality of features at the voxel, wherein each feature at the voxel characterizes a respective property of the three-dimensional medical image at the voxel;

calculating a likelihood probability distribution of each feature based on the determined value of the feature and a parameter value derived from training data;

generating a probability map that indicates a probability of each voxel in the portion of the three-dimensional medical image containing an object to be detected, wherein said generating a probability map includes combining, using Bayes' law, the likelihood probability distributions of the plurality of features at each respective voxel of the portion of the three-dimensional medical image;

detecting the object in the portion of the three-dimensional medical image based on the probability map; and outputting an indication of the detected object.

32. An apparatus for detecting an object in a three-dimensional medical image, the apparatus comprising:

a processing device configured to:

determine, from data representing the three-dimensional medical image, for each voxel in a portion of the three-dimensional medical image, values of a plurality of features at the voxel, wherein each feature at the voxel characterizes a respective property of the three-dimensional medical image at the voxel;

calculate a likelihood probability distribution of each feature based on the determined values of the feature and a parameter value derived from training data;

generate a probability map that indicates a probability of each voxel in the portion of the three-dimensional medical image containing an object to be detected, wherein the generating a probability map includes combining, using Bayes' law, the likelihood probability distributions of the plurality of features at each respective voxel of the portion of the three-dimensional medical image;

detect an object in the portion of the three-dimensional medical image based on the probability map; and output an indication of the detected object.

* * * * *